United States Patent [19]

Kuo et al.

[11] Patent Number: 5,754,695
[45] Date of Patent: May 19, 1998

[54] DEGRADED GRAY-SCALE DOCUMENT RECOGNITION USING PSEUDO TWO-DIMENSIONAL HIDDEN MARKOV MODELS AND N-BEST HYPOTHESES

[75] Inventors: Shyh-Shiaw Kuo, East Brunswick; Chinching Yen, Red Bank, both of N.J.; Oscar Ernesto Agazzi, Irvine, Calif.

[73] Assignee: Lucent Technologies Inc., Murray Hill, N.J.

[21] Appl. No.: 734,369

[22] Filed: Oct. 16, 1996

Related U.S. Application Data

[63] Continuation of Ser. No. 278,733, Jul. 22, 1994, abandoned.

[51] Int. Cl.$^6$ ................ G06K 9/62; G06K 9/74
[52] U.S. Cl. .......................... 382/228; 382/160
[58] Field of Search .................. 382/228, 159–161; 395/20

[56] References Cited

U.S. PATENT DOCUMENTS

| | | |
|---|---|---|
| 4,177,448 | 12/1979 | Brayton ............ 382/160 |
| 4,905,287 | 2/1990 | Segawa ............ 381/43 |
| 5,075,896 | 12/1991 | Wilcox et al. ............ 382/39 |
| 5,261,009 | 11/1993 | Bokser ............ 382/40 |
| 5,289,562 | 2/1994 | Mizuta et al. ............ 395/2 |
| 5,321,773 | 6/1994 | Kopec et al. ............ 382/209 |
| 5,438,630 | 8/1995 | Chen et al. ............ 382/159 |
| 5,459,809 | 10/1995 | Kim et al. ............ 382/160 |
| 5,559,897 | 9/1996 | Brown et al. ............ 382/186 |

OTHER PUBLICATIONS

Tullken, Application of the Grey-Box Approach to Parameter Estimation in Physicochemical Models (IEEE, 1991, Proceedings of the 3oth Conference on Decision Control, Brighton, England, Dec. 1991).

"A Tree–Trellis Based Fast Search for Finding the N–Best Sentence Hypothesis in Continuous Speech Recognition" by F. K. Soong et al., Proc. DARPA Speech and Natural Language Workshop, pp. 12–19.

"Automatic Recognition of Keywords in Unconstrained Speech UsingHidden Markov Models", J. Wilpon et al., IEEE Trans. Acoust. Speech Signal Processing, vol. 38, pp. 1870–1878, Nov. 1990.

"Connected and Degraded Text Recognition Using Hidden Markov Model" by C. Bose et al., Proc. of the 11th Int. Conf. on Pattern Recognition, 1992.

(List continued on next page.)

*Primary Examiner*—Yon Couso
*Assistant Examiner*—Jayanti K. Patel
*Attorney, Agent, or Firm*—Steven R. Bartholomew

[57] ABSTRACT

The present invention provides a method for recognizing connected and degraded text embedded in a gray-scale image. In accordance with the invention, pseudo two-dimensional hidden Markov models (PHMMs) are used to represent characters. Observation vectors for the gray-scale image are produced from pixel maps obtained by gray-scale optical scanning. Three components are employed to characterize a pixel: a convoluted, quantized gray-level component, a pixel relative position component, and a pixel major stroke direction component. These components are organized as an observation vector, which is continuous in nature, invariant in different font sizes, and flexible for use in various quantization processes. In this matter, information loss or distortion due to binarization processes is eliminated; moreover, in cases where documents are binary in nature (e.g., faxed documents), the bi-level image may be compressed by subsampling into multi(gray)-level without losing information, thereby enabling recognition of the compressed images in a much shorter time. Furthermore, documents in gray-level may be scanned and processed with much lower resolution than in binary without sacrificing the performance. This can also significantly increase the processing speed.

12 Claims, 24 Drawing Sheets

OTHER PUBLICATIONS

"Global-to-Local Layout Analysis" by H. Baird, Proceedings of the IAPR Workshop on Syntactic and Structural pattern Recognition, France, Sep. 1988.

"Document Image Analysis" by S. Srihari et al., Proceedings of the 8th International Conference on Pattern Recognition, Paris, Oct. 1986.

"A Tutorial on Hidden Markov Models and Selected Applications in Speech Recognition" by L. Rabiner, Proceedings of the IEEE, vol. 77, pp. 257–286, Feb. 1989.

"A Segmental k-Means Training Procedure for Connected Word Recognition Based on Whole Word Reference Patterns", L. Rabiner, et al., AT&T Technical Journal, vol. 65, pp. 21–36, May 1986.

"A tree-trellis based fast search for finding the n best sentence hypothesis in continuous speech recognition" F. K. Soong et al., Proc. DARPA Speech and Natural Language Workshop, pp. 12–19, Jun. 1990. Comment: At the present time, a copy of this reference is unavailable to us. As soon as we are in receipt of it we will make the same available to the United States Patent & Trademark Office.

"Pseudo two-dimensional hidden markov models for document recognition" by O. E. Agazzi et al., AT&T Technical Journal, vol. 72, pp. 60–72, Sep./Oct. 1993.

"Fundamentals of Speech Recognition", L. Rabiner and B. Juang, PTR, Prentice Hall, 1993. Comment: Because of the voluminous nature of this book, applicants have not included it with this information disclosure statement but have elected to cite the reference. If the Examiner requires the book during prosecution of this application, Applicants will provide a copy of it.

"Hidden Markov Model Based Optical Character Recognition in the Presence of Deterministic Transformations", by O. E. Agazzi et al., Pattern Recognition, vol. 26, No. 12, 1993.

"Keyword Spotting in Poorly Printed Documents Using Pseudo 2d Hidden Markov Models", by S. Kuo et al., IEEE Trans. on PAMI, vol. 16, pp. 842–848, Aug. 1994.

"Connected and Degraded Text Recognition Using Planar Hidden Markov Models", by O. E. Agazzi et al., in Proc. of ICASSP'93, pp. V113–V116, 1993.

"Direct gray-scale extraction of features for character recognition," by L. Wang et al., IEEE Trans. on PAMI, vol. 15, Oct. 1993.

"A frame-synchronous Network Search Algorithm for Connected Word Recognition" by C. Lee et al., IEEE trans. Acouts. Speech Signal Processing, vol. ASSP-37, pp. 1649–1658, Nov. 1989.

"Recognition of Isolated Digits Using Hidden markov Models with Continuous Mixture Densities" by L. R. Rabiner et al., AT&T Tech. J. vol. 64, pp. 1211–1222, Jul./Aug. 1985.

"Minimum Error Thresholding" by J. Kittler et al., Pattern Recognition, vol. 19, pp. 41–47, 1986.

GRAY LEVELS

EXPERIMENTAL RESULTS

CORRESPONDENCE BETWEEN A 1D HMM AND A STRING OF PIXELS

LEVEL-BUILDING ALGORITHM WITH NESTED VITERBI SEARCH

THE SEGMENTAL K-MEANS TRAINING PROCEDURE

1705 IS A CLASSICAL TRAINING PROCEDURE

1 – INITIAL MODEL ESTIMATION 1.1 - FEATURE EXTRACTION 1.1.1 - FEATURE COMPONENT #1

1.1.2 - FEATURE COMPONENT #2

1.1.3 - FEATURE COMPONENT #3

RECOGNITION

3 - FORWARD PATH EXTENSION

4 - BACKWARD SEARCH

4.2 - GET FIRST NON-COMPLETED PATH FROM THE STACK

4.4 - PATH SPLITTING AND ONE-ARC BACKWARD EXTENSION

DEGRADED GRAY-SCALE DOCUMENT RECOGNITION USING PSEUDO TWO-DIMENSIONAL HIDDEN MARKOV MODELS AND N-BEST HYPOTHESES

This is a Continuation of application Ser. No. 08/278,733 filed Jul. 22, 1994, now abandoned.

TECHNICAL FIELD

This invention relates to optical text recognition and more specifically to robust methods of recognizing characters or words regardless of impediments such as poor document reproduction.

BACKGROUND OF THE INVENTION

Stochastic models, such as hidden Markov models (HMMs), together with dynamic programming techniques, have been widely used in the field of speech recognition. For example, see the article entitled "Automatic Recognition of Keywords in Unconstrained Speech Using Hidden Markov Models" by J. Wilpon, L. Rabiner, C. Lee and E. Goldman, IEEE Trans. Acoust. Speech Signal Processing, Vol. 38, pp. 1870–1878, November 1990. It has also been realized that many problems in speech recognition have their counterparts in optical character recognition (OCR). Thus, stochastic modeling and dynamic programming have also been employed for this purpose. For example, see the article entitled "Recognition of Degraded and Connected Text Using Hidden Markov Models" by C. Bose and S. Kuo, Proc. of the 11th Int. Conf on Pattern Recognition, 1992, U. S. patent application Ser. No. 07/813,225, filed Dec. 23, 1991, and U. S. patent application Ser. No. 07/981,028 filed Nov. 24, 1992.

State-of-the-art OCR algorithms are generally based on bi-level images (black characters on white background). The assumption that document images are bi-level is usually not correct. First of all, modern optical scanners provide a gray-scale output. Second, many documents are gray-level in nature. For example, the printed text might be embedded in a gray-level or color picture, or a textured background. Additionally, gray-level information or noise is typically added during the acquisition process. For example, this gray-level information may be incorporated into the optical scanner output due to the blurring effect caused by point spread function of the scanner, or if the scanning process is done in a badly-illuminated environment. Thus, if prior art binarization processes are performed on a document containing gray-level information, significant degradation and/or information loss may result.

Optical recognition of text is often hampered by the use of characters with different sizes, blurred documents, distorted characters and other impediments. Accordingly, it is desirable to improve recognition methods to be robust regardless of such impediments.

SUMMARY OF THE INVENTION

The present invention provides a method for recognizing connected and degraded text embedded in a gray-scale image. In accordance with the invention, pseudo two-dimensional hidden Markov models (PHMMs) are used to represent characters. Observation vectors for the gray-scale image are produced from pixel maps obtained by gray-scale optical scanning. Three components are employed to characterize a pixel: a convolved, quantized gray-level component, a pixel relative position component, and a pixel major stroke direction component. These components are organized as an observation vector, which is continuous in nature, invariant in different font sizes, and flexible for use in various quantization processes. In this manner, information loss or distortion due to binarization processes is eliminated; moreover, in cases where documents are binary in nature (e.g., faxed documents), the bi-level image may be compressed by subsampling into multi(gray)-level without losing information, thereby enabling recognition of the compressed images in a much shorter time. Furthermore, documents in gray-level may be scanned and processed with much lower resolution than in binary without sacrificing the performance. This can also significantly increase the processing speed.

A character is represented by a pseudo two-dimensional HMM having a number of superstates, with each superstate having at least one state. In a preferred embodiment, the superstates represent vertical slices through the word image. Word images are compared with PHMMs by using a Viterbi algorithm incorporated in a level-building structure to calculate the probability that a particular PHMM represents a given section of the word image. Each possible model representation may be conceptualized as an hypothesis. An N-best hypothesis search is performed in combination with a duration constraint. Parameters for the models are generated by training routines. A technique termed the N-best hypotheses search may be advantageously utilized in conjunction with the approach developed above. This hypotheses search provides not only one, but N-best recognition hypotheses. By imposing postprocessing functions on these hypotheses, the recognition rate is greatly improved. The effectiveness of the aforementioned approaches is enhanced by employing duration constraints in the search processes.

These and other aspects of the invention will become apparent from the drawings and detailed description.

DETAILED DESCRIPTION

The word image to be recognized here in accordance with the invention will typically be part of a larger body of textual and graphical material on a page. For the purposes of describing the invention, it will be assumed that the page has been optically scanned and that a word image to be recognized has been captured as a sequence of pixels generated by a conventional gray-level raster scan. Many techniques for performing such operations are well known to those skilled in the art. For example, see the articles "Global-to-local layout analysis" by H. Baird in the Proceedings of the IAPR Workshop on Syntactic and Structural Pattern Recognition, France, September 1988 and "Document Image Analysis" by S. Srihari and G. Zack in the Proceedings of the 8th International Conference on Pattern Recognition, Paris, October 1986.

Such pixel sequences for known characters are used to "train" HMMs representing those characters. As will be explained in more detail below, the pixel sequence for an unknown character string is then compared with the models to determine the probability that the models represent such unknown strings.

Figure 1:
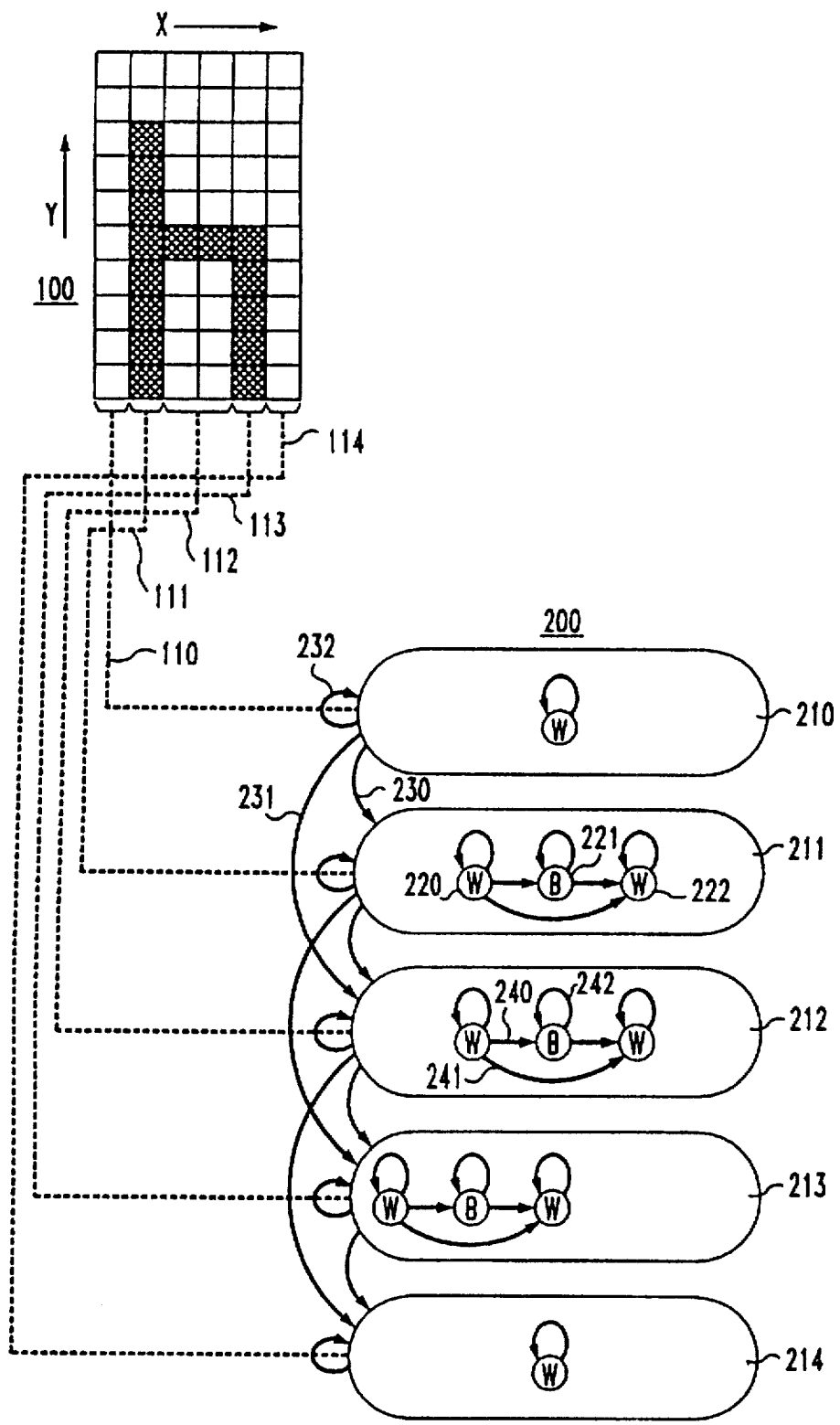
FIG. 1 shows a pixel map of a character together with a corresponding superstate and state diagram for a pseudo two-dimensional HMM.

FIG. 1 shows a pixel map 100 of the character "h" together with a corresponding state diagram 200 for a pseudo two-dimensional HMM for such character, in accordance with the invention. The model is termed a "top-down, left-right" model because it depicts the sequence of states resulting from a vertical gray-scale raster scan of the pixel map. It is called a "pseudo" two-dimensional model because it is not ergodic—that is, it is not a fully-connected two-dimensional network.

Five "superstates" 210–214 are shown in state diagram 200. Such superstates correspond respectively to the five vertical regions 110–114 in pixel map 100. Note that all the columns of pixels in a given one of regions 110–114 are the same number of pixels. Within each superstate 210–214, the various vertical "states" possible in the columns of the corresponding region in the pixel map are shown. For example, superstate 211 includes three states 220–222 representing the white, black and white pixels respectively in the rows of region 111. However, it is to be understood that "white pixels" and "black pixels" are described for purposes of illustration. These pixels could represent any arbitrarily-selected gray level.

Permitted transitions between superstates are denoted by arrows such as 230 and 231. Arrows such as 232 indicate that a transition can occur from a superstate to itself. Similarly, transitions between states are denoted by arrows such as 240 and 241 and transitions to the same state by arrows such as 242. An alternative to the structure of the model represented by state diagram 200 is a model using superstates representing horizontal slices.

The sum of all the probabilities of transition from a state to another state or back to the same state must equal 1. For example, a transition probability is associated with each transition from state 210 indicated by arrows 230, 231 and 232. The sum of the transition probabilities from a state to another state is the reciprocal of the duration of the state, measured in number of pixels. Thus, the length of a gray-level segment in a raster scan of the pixel map is represented by the associated transition probability; a long segment corresponds to a state with low transition probability to the next state; a short segment corresponds to a state with high transition probability. The same principles also apply to superstates. The presence of noise influences the probability of observing pixels having specific gray levels.

The observations for a text element are based on the pixels. One kind of observation is based upon gray-level characterizations of pixels. Other kinds of observations can include additional information, such as transition or position information. When such additional information is included, each observation can be a vector quantity representing several different components. An example of such an observation vector will be given below.

The pseudo two-dimensional hidden Markov model utilized by a preferred embodiment described herein employs a concept referred to as the duration probability of a character. The duration probability of a character $D(x)$ is given by $D(x)=P(m=x)$, where m is specified in units of columns. Similarly, the duration probability for a superstate $D_v$: $\{D_i: 0 \leq i \, N \text{ sub } v;\}$ is defined as $D_i(x)=P(m=x)$, where m is the duration of superstate i with m being specified in units of columns. The duration of a state $D_s{}^j=\{D_i{}^j|0 \leq i \leq N^j\}$ is defined as $D_i{}^j=P(m=x)$, where m is the duration for state i in superstate j, and m is in units of pixels.

The data structure used to represent a basic pseudo two-dimensional hidden Markov model consists of:

the number of superstates ($N_v$), initial probabilities for the superstates ($\Pi_v$), superstate transition probabilities ($A_v$), duration probabilities for character $D(x)$, and, for each superstate:

the number of states in the superstate ($N_h$), initial probabilities for the states ($\Pi_h$), state transition probabilities within the superstate ($A_h$), duration probability for the superstate $D_i(x)$, observation probabilities for each state in the superstate ($B_h$); and, for each state, the duration probability $D_i{}^j$ for the state.

Figure 4:
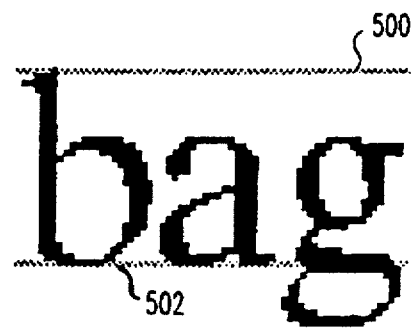
FIG. 4 is a diagram of a convolution kernel used to produce an observation vector.
Figure 5:
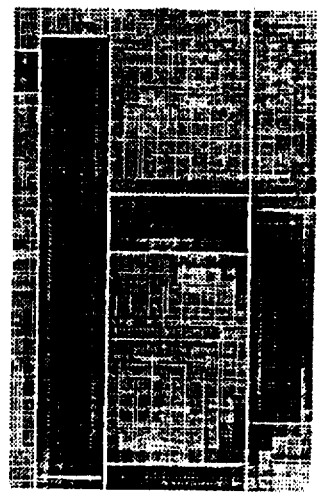
FIG. 5 is a diagram showing the topline and the baseline for an illustrative textual image.

An observation vector $O_{xy}$ may be defined for each pixel at coordinates (x, y). The observation vector $O_{xy}$ has three components. The first component of the observation vector, $O_{xy}{}^1$, is calculated as:

$$O_{xy}^1 = \sum_{x=-1}^{1} \sum_{y=-1}^{1} m_{i-x,j-y} * C_{xy}$$

where $m_{i,j}$ is the gray-level of the pixel at (i,j), and $c_{xy}$ is from a 3 pixels by 3 pixels kernel as shown in FIG. 5. The kernel applies weighting factors to pixels as shown in FIG. 4. In other words, the kernel of FIG. 4 effectively convolves an entire image comprised of an array of pixels. The purpose of convolution is to reduce the effect of randomness on the grey level value caused by noise. The surrounding pixels are also contributing to the feature evaluation for the center pixel. The resulting gray level value of the pixel (from 0 to 255) is then quantized into 100 levels.

The second component of $O_{xy}$ is the relative position of each pixel in the columns. It is assumed that, after layout analysis of the document, the position of the baseline and the difference between topline and baseline are known. (Refer FIG. 5 for a definition of the topline 500 and the baseline 502). The actual value of the second component is $$\text{second component} = \frac{\text{distance (in pixels)}}{\text{distance from topline 500 to baseline 502}}$$

It is then quantized into 50 levels. Obviously, the value could be negative for part of g, p, q, . . . etc., that is below the baseline. This feature indicates the location of each pixel in the column regardless of the point size of the printed characters. In this way, the feature could be more robust in different applications.

The third component value of $O_{xy}$ is the direction of the major stroke in which the pixel resides. The entire image is subjected to a process of thresholding, described in greater detail in "minimum error thresholding", J. Kittler and J. Illingworth, Patent Recognition, Vol. 19, p. 41–47 (1986). For each pixel, the length of strokes (in terms of continuous black pixels) is computed in four directions: 0°, 45°, 90°, 135°, and the longest stroke is selected which passes the pixel as its major stroke direction. The 5th "direction" is for background pixels, which have no definition for direction or stroke. $O_{xy}$ thus has five distinct component values.

Pseudo two-dimensional HMMs can be thought of as elastic templates because they allow for distortion in two dimensions, thus significantly increasing the robustness of the model. For example, vertical distortion, as often occurs in facsimile transmission, can be accommodated by the methods of the invention.

In the state diagram for a pseudo two-dimensional HMM, only top-to-bottom transitions between states are allowed (possibly skipping one state as indicated, for example, by arrow 241), and only left-to-right transitions between superstates are allowed (possibly skipping one superstate as indicated, for example, by arrow 231). Skipped states can occur when characters are blurred, or when different character fonts are used, as described above. In this invention, we assume no skipping state and/or superstate is possible.

The Viterbi algorithm is a well-known dynamic programming method that can be used for calculating the probability that a particular HMM is a match for a given sequence of observations. This algorithm is widely used in speech recognition as, for example, described in the article entitled "A Tutorial on Hidden Markov Models and Selected Applications in Speech Recognition" by L. Rabiner in Proceedings of the IEEE, Vol. 77, pp. 257–286, February 1989. The Viterbi algorithm has also been used in text recognition, as described in U. S. patent application Ser. No. 07/813,225 assigned to the assignee of the present patent application mentioned above.

In accordance with the Viterbi algorithm, the probability δ of being in each state of the HMM is calculated for each observation, resulting in an N×T array, usually called a "trellis," of probabilities where N is the number of states and T is the number of observations in the sequence. The highest such probability P* after the last observation in the sequence is used as the "score" for the HMM in regard to the sequence of observations. The process of tracking the sequence of states (and/or super-states) to determine the best path through the model is known as segmentation. For some applications an array of backpointers is also maintained so that the actual state sequence can be reconstructed. For simplicity, the term "state" as used herein throughout may refer to a state and/or a superstate.

After all T observations have been accounted for, the final probability for the HMM can be chosen to be the maximum probability calculated after the last observation:

$$P^* = \max_{1 \leq i \leq N} [\delta_T(i)]$$

where the final state associated with P* is:

$$q_T^* = \underset{1 \leq i \leq N}{\operatorname{argmax}} [\delta_T(i)]$$

Typically, such state will be state N. However, cases are possible in which the maximum probability after the last observation is associated with a state other than state N. In some applications of HMMs, such as speech processing and character recognition, it is preferred in such cases to use the probability calculated for state N after the last observation as the probability for the HMM, not the maximum probability.

For pseudo two-dimensional HMMs, the Viterbi algorithm is used repeatedly for the superstates and the states within each superstate. Such PHMMs are thus treated as nested one-dimensional models rather than truly two-dimensional.

Figure 2:
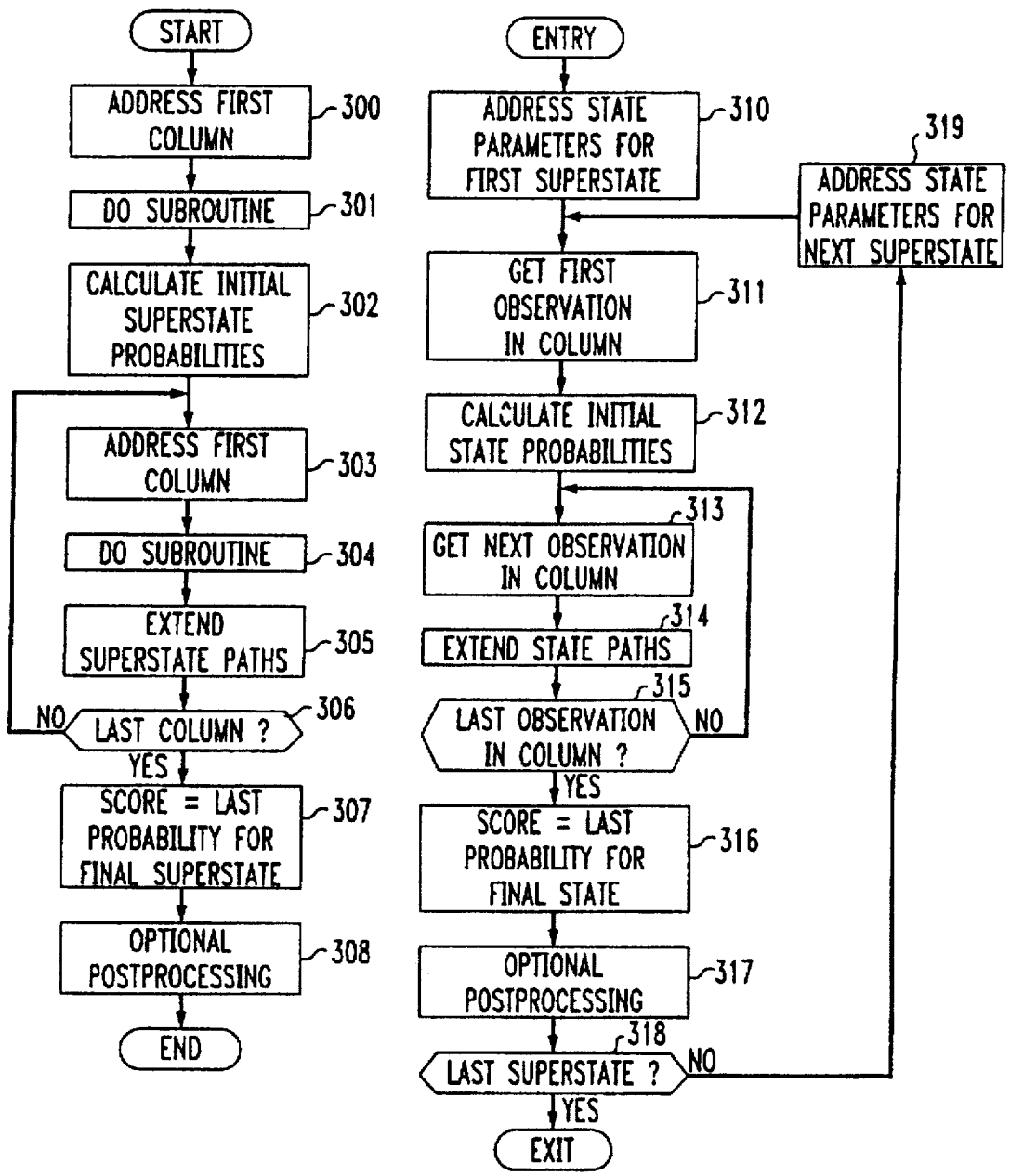
FIG. 2 is a flow chart showing the operation of a computer programmed to compare a pixel map for a word image with pseudo two-dimensional HMMs in accordance with the invention.

FIG. 2 is a flow chart showing the operation of a computer programmed to compare a pixel map for a word image with a set of pseudo two-dimensional HMMs in accordance with the invention, in which the superstates represent vertical slices. Steps 300–307 show the main routine, which uses the Viterbi algorithm to calculate the maximum probability for segments of image from probabilities P* that a particular columns of pixels belongs in a particular superstate. Steps 301 and 304 of the main routine each use a subroutine, shown in steps 310–318, that uses the Viterbi algorithm for each superstate to calculate such probabilities P* for each column. It is assumed that the observations making up the pixel map and the various parameters for the HMMs are stored in appropriate memory areas in the computer performing the calculations.

At the start of the main routine, the observations for the first column are addressed (step 300). Then the subroutine (steps 310–318) is performed using such observations. Upon entry into such subroutine, the HMM state parameters $N_v$, $\pi_v$, $A_v$, and B for the first superstate are addressed (step 310), then the first observation in the current column is retrieved (step 311) and the initial state probabilities for the superstate are calculated (step 312) using the appropriate parameters $\pi_v$ and $B_v$ in the equation $$\sigma(i) = \pi_v b_i(O_1), \quad 1 \leq i \leq N,$$

where N equals the number of states, $\pi_i$ equals the probability of being in state i initially, $b_i$ equals the probablity of a given observation in state i, and $O_1$ equals the actual initial observation. Then the next observation in the current row is retrieved (step 313) and the next set of state probabilities is calculated (step 314) using the appropriate parameters $N_h$, $A_h$ and $B_h$ and the equation $$\sigma_t(j) = \frac{max}{1 \leq i \leq N} [sigma_{t-1}(i)a_{ij}]b_j(O_T), 2 \leq t \leq T, 1 \leq j \leq N$$

where T equals the number of observations and $a_{ij}$ equals the transition probability from state i to state j. This equation extends the best paths through the states. After the last observation in the row (step 315), the probability P* for such column and the current superstate is the last probability calculated for the final state in the column, not the maximum probability calculated after the last observation (step 316). However, as described above in conjunction with the equations for P* and $q_t$*, the probability calculated for the final state after the last observation will typically be the maximum probability. An optional postprocessing step (step 317) is indicated, which can be used for various refinements to the method of the invention, as will be described below.

If there are still more superstates (step 318), the state parameters of the next superstate are addressed (step 319) and steps 311–318 are repeated for the current column and the next superstate. Thus, the subroutine returns a probability P* for the current column and each superstate.

Upon exit from the subroutine entered in step 301, the initial probabilities are calculated from the HMM superstate parameters $\pi_v$ and $B_v$, and equation (1) using such returned probabilities P* for observations $O_{xy}$ (step 302). Then the next column is addressed (step 303), the subroutine is repeated (step 304), and the best paths through the superstates are then extended by calculating the next set of superstate probabilities (step 305) using equation (3), the appropriate HMM parameters $N_v$, $A_v$ and $B_v$, and the probabilities P* returned by the subroutine for observations $O_{xy}$. If there are still more rows (step 306), steps 303, 304 and 305 are repeated for the next row. Finally, after the last row, the ultimate likelihood score that the HMM represents the text element being compared is the last probability evaluated for the final superstate (step 307). Again, an optional postprocessing step (step 308) is indicated for refinements to be explained. It will be clear that the above-described method can also be used for HMMs in which the superstates represent horizontal slices. In such cases, references to "columns" can be replaced with references to "rows".

Many of the calculations used in HMMs involve multiple calculations of products of probabilities. It is usually more convenient, and preferred, to convert such calculations to logarithmic form. Using logarithms for such calculations not only avoids problems with numerical precision but also simplifies products to sums while retaining the relative value relationships needed when comparing an unknown to various models to find the most suitable model.

Figure 3:
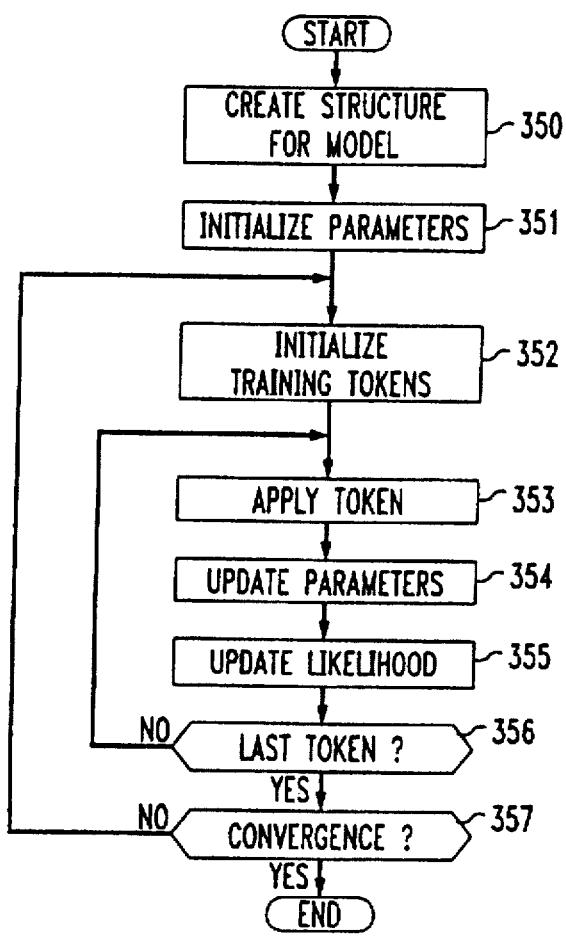
FIG. 3 is a flow chart showing the procedure for creating a pseudo two-dimensional HMM.

The parameters $\pi$, A and B can be estimated for a pseudo two-dimensional HMM by using the segmental k-means algorithm described in the article entitled "A Segmental k-Means Training Procedure for Connected Word Recognition Based on Whole Word Reference Patterns" by L. Rabiner, J. Wilpon and B. Juang, AT&T Tech J., Vol. 65, pp. 21–36, May 1986. FIG. 3 is a flowchart showing the procedure for creating a pseudo two-dimensional HMM. First, the structure of the model, that is, the number of superstates and states in each superstate, is determined (step 350). This can be accomplished by gray-level scanning a clearly-defined sample of the text element to be represented by the HMM to create a pixel map, counting the transitions in each row of the pixel map and grouping together adjacent rows having the same number of transitions and similar but not necessarily identical grey levels of pixels. Each group then correspond to a superstate and the number of transitions in the rows in the group corresponds to one less than the number of states in the superstate. For example, referring again to pixel map 100 in FIG. 1, the two adjacent columns in region 112 each have two transitions and the same number of black and white pixels, corresponding to a superstate having three states. The column in region 113 also has two transitions, but with significantly different numbers of black and white pixels than the column in region 111, so the column in region 113 forms its own superstate.

The number of superstates and states for each character model is determined by image topology. First, original columns are employed as initial blocks of the image, and then the two neighboring blocks which carry the highest cross correlation coefficient are grouped together to become one bigger block. This same grouping process is repeated until only a given number of blocks are left, or a certain correlation coefficient score threshold is reached. For example, the number of final blocks may be decided by inspecting character topology, and given before the grouping process starts. After those vertical blocks of columns are formed, one then examines each vertical block to group rows within the block by using the same process as was done for columns.

Figure 6:
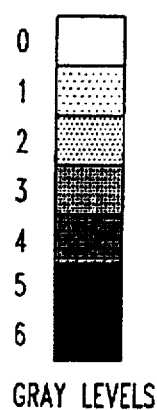
FIG. 6 is a diagram showing an illustrative state and superstate segmentation of a gray-level textual image.

FIG. 6 shows the final grouping (cutting) for image "b". As can be seen in this figure, the character "b" can be represented by a PHMM with four superstates, and 3, 3, 5, 3 states within each superstate, respectively. The exact location as to where the cutting should be made is determined automatically through this iterated correlation comparison. This is specially important for gray-level images with noise and blur, for it is difficult to make meaningful, efficient, and consistent segmentation (grouping) for different characters and samples by manual operation. For each character, the procedure is repeated for a few sample images. Based on the segmentation, an initial estimate of the PHMM is constructed for the character. Note that this procedure is only required when there is no initial estimates of PHMMs available to start the training process.

Next, the parameters for the model are initialized (step 351). This can be done by using parameters derived above from the sample used to create the structure. After the structure for the model is created and the parameters are initialized, the values of the parameters can be reestimated by "training" the model. Training may be accomplished using representative samples (tokens) of the word images in the form such images are likely to take in the text to be recognized (step 352). An observation sequence (pixel map) is created for each token, and the Viterbi algorithm is then used for segmentation of the observation sequence with respect to the model (step 353). The parameters are then updated in accordance with histograms of the results of the segmentation (step 354). For example, the updated estimates of parameters $\pi_i$, $a_{ij}$ and $b_i$ would be:

$$\pi_i = \frac{\text{number of tokens starting from state } S_i}{\text{total number of tokens}}$$

$$a_{ij} = \frac{\text{number of transitions from state } S_i \text{ state } S_j}{\text{total number of transitions starting from state } S_i}$$

$$b_i(p) = \frac{\text{number of observations of } p \text{ in state } S_i}{\text{total number of observations}}$$

During reestimation, the Viterbi algorithm is used to calculate a likelihood for each token with respect to the model, and such likelihoods for all tokens are combined (probabilities are multiplied, log probabilities are added) to provide an overall likelihood of the effectiveness of the model with respect to the tokens (step 355). After all the tokens have been processed (step 356), if the parameters have converged, that is, such overall measure has reached essentially its maximum value, the training procedure is complete (step 357). If not, the training procedure is repeated. A typical method of determining convergence is to compare the overall likelihoods from step 355 for successive iterations. If the difference is small, indicating that the parameters have not changed significantly during the last iteration, then convergence can be assumed. For a two-dimensional HMM, the parameters $\Pi_h$, $A_h$ and $B_h$ for the superstates and the parameters $\Pi_v$, $A_v$, and $B_v$ for the states within the superstates can all be determined by this method.

Other methods known in the art can be used to estimate the parameters for HMMs; for example, the Baum-Welch reestimation formulas and the generalized probabilistic descent method.

In a conventional HMM, the probability of remaining in a state for a duration di (the probability density) is an exponential function expressed as $$P(d_i) = a_{ii}^{(d-1)} a_{ij}$$

where $a_{ii}$ is the self-transition probability and $a_{ij}$ is the transition probability to the next state. However because the distribution of state durations in actual practice is not likely to result in an exponential probability density, significant improvement in performance can be achieved by introducing more elaborate state duration densities into the HMMs.

Following is one way to include duration. Segmentation into states is first accomplished using the parameters $\Pi$, A and B as described above, then the scores calculated during segmentation are adjusted in a postprocessing step using the backpointers from array $\psi$ to retrieve parameters for a more appropriate probability density for each state in the best path. An example of such adjustment is to replace the self-transition probabilities for each state with Gaussian state duration probability densities.

For each state or superstate qi, such adjustment can be accomplished as follows:

$$p(i) = \delta \left[ \frac{P_i}{a_{ii}^{(d(i)-1)}} \right] \left[ \frac{1}{\sqrt{2\pi} \sigma_i} e^{\frac{-(d(i)-d_0(i))^2}{2\sigma_i^2}} \right]$$

where the first term in brackets extracts the exponential probability density and the second term in brackets inserts the Gaussian probability density, $a_{ij}$ is the self-transition probability, d(i) is the actual state duration in number of pixels and $d_0$ (i) is the mean and $\sigma_i$ the standard deviation of state durations. The value of d for a given state is determined from the array $\psi$ by counting the number of self-transitions in the state or superstate. The values of $d_0$104 (i) and $\sigma_i$ can be established for each state or superstate during training as follows:

$$d_0(i) = \frac{1}{N} \sum_{k=1}^{N} [d_i(k)]$$

$$\sigma(i) = \sqrt{\frac{1}{N} \sum_{k=0}^{N-1} [d_i(k) - d_0(i)]^2}$$

where N is the number of entries into state $q_i$ and $d_i$ (k) is the duration of entry k.

Since the final probability P* is the product of the probabilities for all states passed through, such adjustment can be performed repeatedly on P* using the mean and standard deviation for each state passed through in turn. If P* is expressed as a logarithm, the adjustment can be accomplished by converting the adjustments to logarithmic form, summing such logarithmic adjustments for each state passed through and then adding the total adjustment to logP*.

Under the nested Viterbi search structure, duration penalty is incorporated as part of the path search process, according to a preferred embodiment described herein. To incorporate duration penalty into the final probability P*, the likelihood should be updated along the path at each node as follows:

like(i,k)=max[like(i,t−1)+a(i,i), like(i−1, t−1)+a(i−1, i)+State (or superstate, character) Duration Penalty] +$b_i(O_k)$;

where $b_i$ ($O_k$) is the likelihood for node i (which could be superstate or state, to generate observation $O_k$, like(i, k) is the path likelihood score accumulated up to node i and frame (or pixel) k, and the duration penalty is the minus log scale of the duration probability. The duration probability may be found through training by calculating histogram of the length of the duration of states, superstates, and characters. The histogram for states is in units of pixels, and for superstates and characters are in columns. As one might notice in the equation, the duration penalty is added only when a transition occurs between different states, superstates or characters. The character duration penalty is added on top of the superstate duration penalty at the transition out of the last superstate of any character models. In this way, duration penalty is incorporated in the forward search, instead of as a postprocess. The incorporation of duration penalty greatly improves character recognition performance. Used in conjunction with an N-best approach, (to be described hereinafter) it can also give better word candidates, especially for those cases where the best candidate is not the correct one. It can also greatly reduce the search size for proper higher-level postprocessing (e.g. dictionary check).

At the end of the level building algorithm to be described hereinafter, the best combination of character models can be identified by tracing back the optimal path. The corresponding word is the word recognized by the algorithm.

Recognition accuracy can be significantly improved by incorporating the N-best search to be described hereinafter. A suitable global N-best hypotheses algorithm is described in F. K. Soong and E-F. Huang ,"A tree-trellis based fast search for finding the n best sentence hypotheses in continuous speech recognition," in Proc. DARPA speech and Natural Language Workshop, pp. 12–19, June 1990, which combines a forward Viterbi-based trellis search, and a backward tree search. According to a preferred embodiment disclosed herein, the algorithm disclosed by Soong and Huang is enhanced as follows, to provide an improved hypothesis search algorithm. The enhancements include the incorporation of a duration penalty in the forward search, and use the path map and duration information from the forward pass to do penalty correction in the backward search. As a result, the recognition performance has been significantly enhanced, as will be described in greater detail hereinafter.

Pursuant to the enhanced N-best hypotheses algorithm, the N-best hypotheses are obtained by first executing the nested Viterbi forward search, and then followed by a backward search. The backward search is worked around a main path stack, where each entry of the stack is a branch of the tree (a path), and is rank ordered from top down in the stack, according to its path likelihood score. It is understood that a back-tracing path should start from a terminal node. For each terminal node of each character model at every level, a null path is constructed with only a terminal node in it, along with its final accumulated path score obtained after the Viterbi search. The paths are inserted one by one in ranked order according to their path scores. Remember that at this time, the path score is still equal to the accumulated likelihood scores in the Viterbi search. No modification is performed yet. These paths will then develop backward towards their initial nodes (i.e. from right to left, towards frame 0). The paths are named the "backward partial paths" to identify the direction of path development, and to indicate that the backward development is not completed yet. The front-most node of this backward partial path, i.e. the left most node of it, is here called "front node". The backward development of the path is "completed" when the front node is equal to the initial node. If M is the stack size, then after the top M null paths are placed into the stack, (those with top path scores out of all others), the initial stack setting up is finished.

Figure 7:
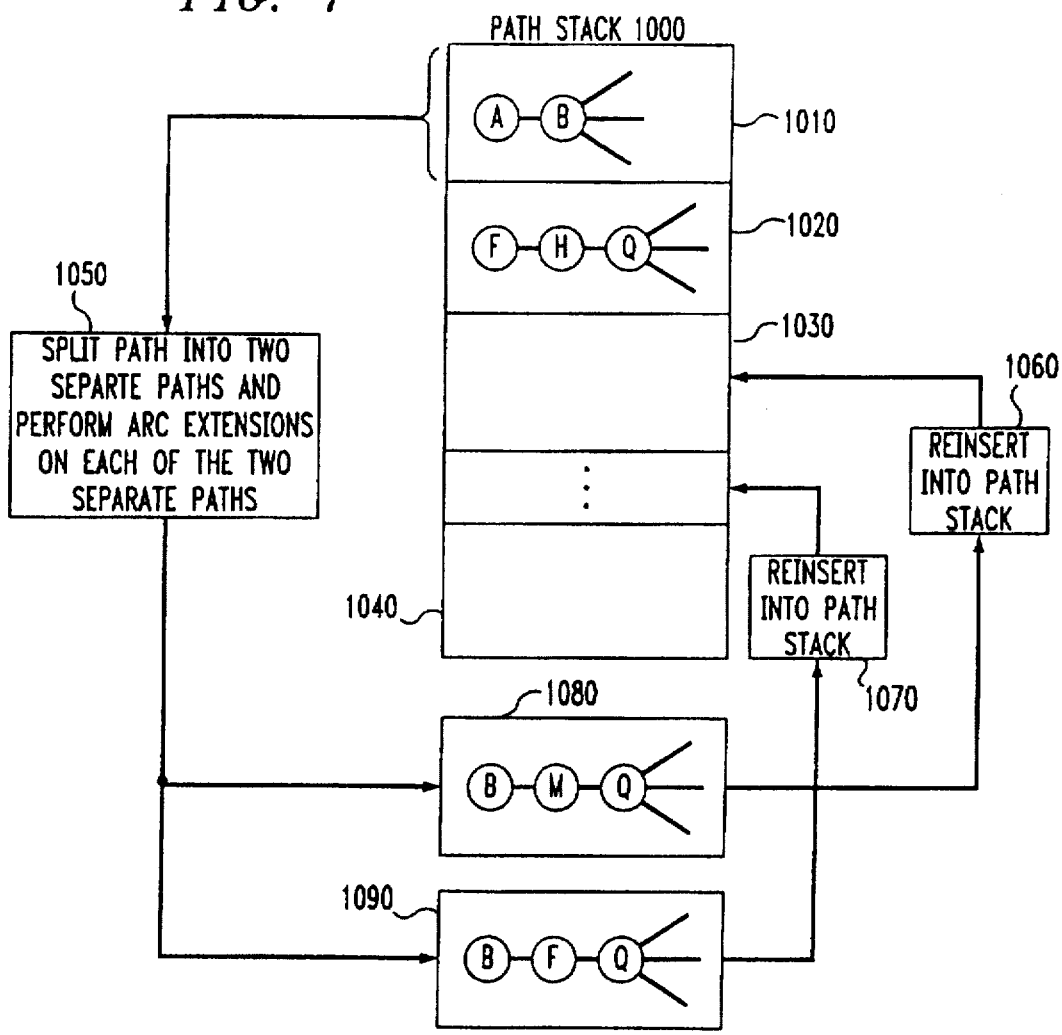
FIG. 7 is a graph showing the character recognition rates of various preferred embodiments disclosed herein for three different character testing sets.

With reference to FIG. 7, the following process is repeated until all the M paths in the main path stack 1000 have been subjected to the process. The process starts by removing the top path 1010 from the path stack 1000. This top path 1010 is the path which has the best path score among all paths for the time being. If the top path 1010 has already been subjected to the process described in this paragraph, put the top path 1010 back into the path stack 1000 and take the next path 1020 in the path stack 1000. For the first non-completed path, the process described herein (block 1050) is used to split the path into two separate paths: a first path 1080 with the best one arc (backward) extension and a second path 1090 with all remaining possible extensions. Then, insert these two "new" paths back into path stack according to their updated path score (blocks 1060 and 1070), such that the whole stack is still in sorted order. If this non-completed path has only one incoming path available, then no path splitting is possible. One arc extension is performed and the extended path is then inserted back into path stack.

Figure 8:
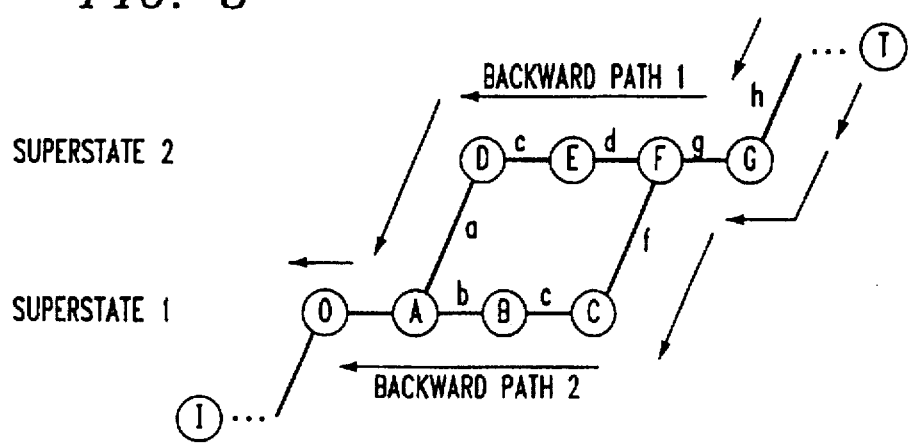
FIG. 8 is a diagram setting forth the data structure flow for a path stack.

FIG. 8 is a small section of the path map obtained from forward Viterbi search, which is also used for backward tree search. Capital letters denote superstate nodes. When put as a string, they can also be used to represent a portion of a complete path. For example, ABCFG represents part of path 2 in FIG. 8. $f_x(y)$ represents the duration penalty for staying y units long in superstate x. The penalty is the minus of the log of duration probability. As seen in FIG. 8, the growth of the backward path is constituted by sequential backward arc extension from terminal node T headed towards the initial node I. When doing the backward one-arc extension of the partial path, duration penalty is re-evaluated to reflect the exact duration fitness. The basic mechanism for one arc extension in the backward tree search is as follows:
Backward Partial Path Score Update in One Arc Extension:

$PPS(E) = PPS(F) -$ Current Duration Penalty $+$

Corrected Duration Penalty $+$

Other Updates for the Extension from $F$ to $E$;

Complete Path Score Update:

$CPS(E)\&=\&PPS(E)+FPS(E);$ where PPS(E) is the backward Partial Path likelihood Score with front node E, CPS(E) is the Complete Path Score updated up to E. A complete path here in CPS(E) is a connection of a backward Partial Path, formed by connected one-arc-extensions backward from the terminal node T all the way to node E (with score PPS (E)), and a Forward optimal Path from initial node I coming into E (with score FPS(E)). The forward optimal path is recorded during the forward trellis search These two paths are joined at node E. In other words, when started at the terminal node, all CPS scores are the same as those final likelihood scores obtained from the forward Viterbi search. As the path developed backward, the CPS keeps updating node by node, until the initial node I is finally reached, where CPS(I)=PPS(I).

A detailed description of each term in the equation above is as follows:

1. Current Duration Penalty (DP):

The path keeps record of the penalty it is paying for the current state. The penalty calculation is based on how long the path has been staying in this state, plus how long it will be staying before change to another state. The latter information is recorded as part of the best incoming path to each node in the forward search. Since the best incoming path might be different for each node, this penalty is updated together with other path information every time a backward one arc extension is made. Consider the paths in FIG. 8 as an example. We assume here that path ABCFG is the selected over ADEFG in forward stage. When the backward path reaches node F, the "current state" is state 2, and a state transition out of this state is expected after F, according to the forward path map. Therefore, DP should be $f_2$ (2), for staying over G, F in state 2. But when the path reaches node C, the "current state" is now state 1, and the DP should now be updated as $f_1$ (3). This is from the expected traversal through C, B, and A, according to the path map.

2. Corrected Duration Penalty (CDP):

In this term, the forward and backward information is combined to determine the correct duration penalty at each extension. This process is implemented as follows:

Assume as before that path ABCFG is preferred over path ADEFG in forward stage. This implies that, during the forward stage, the accumulated likelihood score at C should be better (smaller) than at E (so that F chose C at that time). Upon closer examination, it is apparent that, at the selection moment, path ABCFG was not compared with path ADEFG, but rather ABCF was compared with ADEF instead. According to the original Viterbi structure, the best path to G from F should be an extension of the best path into F. But this is not necessarily the case when duration penalty is added at the transition of each state. In the forward pass, it was not known how long the duration would be for the current state, until there is a change to another state. For this reason, one does not impose a penalty for a given state until a change-of-state transition happens. But after the forward state transition is completed, one can see from FIG. 8 that the cost of passing through F-G will be different for ABCFG and ADEFG. That is the reason why a preferred incoming path at point F does not guarantee a winner after F-G. No character recognition improvement results for this situation in the original one-pass-only decoding structure, but this situation may be improved through the use of a backward search.

For example, as the backward path grows from G to F, the duration penalty added in the complete path score is partly from the best forward path duration information, i.e. A-B-C for state 1 (implicitly as part of the score of the optimal forward path into F) and F-G for state 2 (explicitly recorded as DP in our backward path data). If, now at F, one tries to make an one-arc-extension backward, a comparison between F-C extension (path 2) and F-E extension (path 1) is necessary.

Upon consideration of FIG. 8, it is apparent that a correction formula may be developed as follows:

(a) For F-E extension: no state transition occurs

The predicted duration for state 2:
How long has this path been staying in state 2: 2 (i.e. G, F)
How much longer will it be staying in state 2 if through E: according to the best path ADEF from the forward pass, it's 2 (i.e. E, D)
The total backward predicted duration in state 2 is: 2+2=4;
The CDP (to the best of current knowledge): $f^2$ (4);

The penalty this path has already been paying at F for state 2: according to the originally preferred path 2: $f_2$ (2) (for staying in F, G)

The correction for duration penalty should be:

$$[PPS(E)=PPS(F)-f_2(2)+f_2(4)+\ldots;]$$

The updated DP is now: $f_2$ (4)

(b) For F-C extension: state transition occurs

Correction for the state just finished:
The penalty currently paid in the path according to the forward path information is the same as case 1 above (note that we still are considering only one path at F up to now): $f_2$ (2);
When path 2 has actually stayed in state 2 for 2 units, so the CDP should be: $f_2$ (2);
When path enters C, the penalty to be paid for state 1, according to the best incoming path at C is: $f_1$ (3) (for C, B, A);

The final duration correction for going into C is $$[PPS(C)=PPS(F)-f_2(2)+f_2(2)+f_1(3)+\ldots;]$$

The updated DP is now: $f_1$ (3)

This CDP information is calculated and stored in the node every time it is reached by a backward search path. Notice that CDPs of the same node could be different when reached by different backward search paths.

3. Other Updates: all probabilities are in minus log scale
(a) for F-E extension:

$$[PPS(E)=PPS(F)+\ldots+a_{22}+O(E)]$$

where
$a_{22}$=state transition probability from state 2 to itself
$O(E)$=Observation likelihood
(b) for F-C extension:

$$[PPS(C)=PPS(F)+\ldots+a_{12}+O(C)]$$

where $a_{12}$=state transition probability from state 1 to state 2
The final PPS update equation should be:
(a) for F-E extension:

$$[PPS(E)=PPS(F)-f_2(2)+f_2(4)+a_{22}+O(E)]$$

(b) for F-C extension:

$$[PPS(C)=PPS(F)-f_2(2)+f_2(2)+f_1(3)+a\_12+O(C)]$$

As mentioned before, the complete path score CPS is composed of the partial backward path score (PPS) and the score of the best incoming path into the front node, (FPS) which is the optimal forward partial path score recorded in forward Viterbi pass.

Therefore, the final CPS equation should be:
(a) from F-E extension:

$$[CPS(E)=PPS(E)+FPS(E)]$$

(b) from F-C extension:

$$[CPS(C)=PPS(C)+FPS(C)]$$

Figure 9:
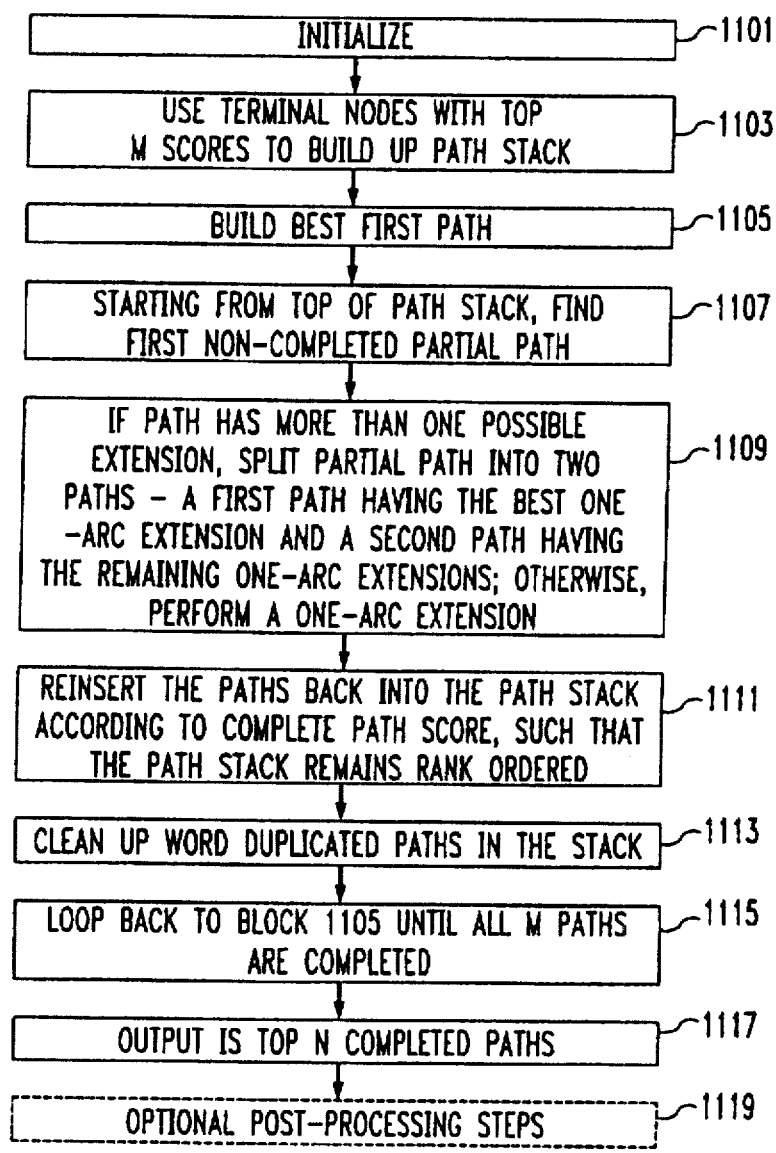
FIG. 9 is a diagram showing the topology of a backward tree search.

Through the process mentioned above, the predicted CPSs of all the possible extensions was determined (at F, the extensions are F-E and F-C). The best extension with which to perform the actual arc extension was selected. Here, select extension E, assuming that CPS(E)<CPS(C) after correction). This "actual" extension means the front node is moved one arc backward (in this case, from F to E), and change the path score to be as predicted (i.e. CPS(E)); the remaining possible extensions (here only F-C) will still be left with the original path, with front node still at F and new path score to be the best of the remaining (in this case, CPS(C)). As seen in FIG. 9., a backward partial path originally with front node F is now split into two paths, one with the best one arc extension to move the front node to E, the other with the same original front node F and the remaining possible extensions (both paths are now to be reinserted back into path stack).

Since one goal of character recognition systems is to find the top N "word" hypotheses for high-level grammar or dictionary checks, no two paths in the stack should lead to the same "word" hypothesis, specially under limited stack space. In a manner analogous to that of calculating CPS, the "word" hypothesis can also be traced by connecting the backward path already developed with the optimal incoming forward path obtained from the Viterbi search. The whole stack is examined for duplication whenever there is a path (re)insertion. Among all the paths with a duplicated "word", only the best path is retained and all the other paths are removed. Starting from the beginning of the stack, there is usually only one duplication to be compared and removed.

With reference to the flow chart of FIG. 9, the procedures described in the immediately preceding paragraphs may be summarized as follows wherein M=N+5 is the path stack size.

INITIALIZE (block 1101);

Use terminal nodes with the top M scores to build up the path stack (block 1103). All the paths are now null paths and only one node a terminal node. Enter a LOOP to develop the best first path (1105). Starting from top of the path stack, find the first non-completed partial path (block 1107). If this path has more than one possible extension, split the partial path into two: a first path having the best one-arc extension and a second path having the remaining one-arc extensions. Otherwise, do a one-arc extension (block 1109). Reinsert the path(s) back into path stack according to complete path score, so that the path stack is still rank ordered (block 1111). Clean up word duplicated paths in the stack (block 1113). Loop back to block 1105 until all M paths are "completed" (block 1115). The output is the top N completed paths (block 1117). Optional postprocessing may be performed at block 1119.

The above-described techniques have been experimentally verified. In the experiments, all images in the database were computer-simulated word images. The images were based upon a clean word image to which Gaussian noise, with standard deviation $\sigma_n$ as the parameter, was added. A blurring process was then performed where the image was convolved with a 2D Gaussian function specified by the standard deviation $\sigma_b$. Therefore, the parameters set ($\sigma_n$, $\sigma_b$) specifies how much the image quality has deteriorated. Some normalization process may be employed in generating the image database, such that the drifting of the means of gray-level for the background and foreground pixels can be limited. Nonetheless, the distribution of gray levels varied considerably in the experiments.

The initial models for the training process were built from two images per character, with parameter (50, 0.8) and (20, 0.2), respectively. The correlation coefficient method to perform the initial segmentation for each of the matches as described previously. This segmentation will enable the obtaining of the initial model for each character through the same estimation procedure as in training. The k-mean training procedure can then operate on a larger training set to get the final converged models.

The training set is generated in a similar manner as the training set for the initial models. The noise and blurring range are now (50–59, 0.8–0.7), with about 10 samples per character. Obviously, this is a training set with very narrow dynamic range. Nonetheless, this still results in a very robust models set, as will become evident from the experimental results.

Three testing sets were employed to evaluate the performance of the techniques described herein. The size of each set is about 200 words, with more than 1,000 characters, and length varying from 2 to 12 characters. The first set is generated in the same parameter range as the training set. The second and third set is different from the first one, not only in term of blur and noise, or in the word collection in each set, but with the gap between characters in a word is now set to zero, instead of the original 1 pixel width in the training set and testing set 1. This results in images with connected neighboring character. The parameter range for set 2 is (70–79, 0.9–1.0), and set 3 is (80–89, 1.0–1.1). The algorithms we compared are binary, gray-level, and gray-level with N-best search, all with duration constrain.

There are some minor differences in accessing the recognition results. In an N=1 case, the experiment reveals to show the effectiveness of duration correcting in the backward search. Therefore, the recognized word is the word that comes out directly from the best in stack, right after the backward search with duration correction is completed. No postprocessing is imposed. For N=10, a dictionary check is performed to search through all 10 candidates, in a top down order, starting from the best in stack. The first hypothesis with the word that could be found in the dictionary will be the output. If none of the top 10 candidates are found in dictionary, the top candidate will be used as the output.

The binary approach uses feature vectors with thresholded pixel value (0 or 1) as the first component to replace the gray-level one. The threshold algorithm used is the same algorithm used to extract the 3rd component of the feature vector, as described above. The rest of the vector components are exactly the same as the gray-level approach. This gives two approach a fair comparison.

Figure 10:
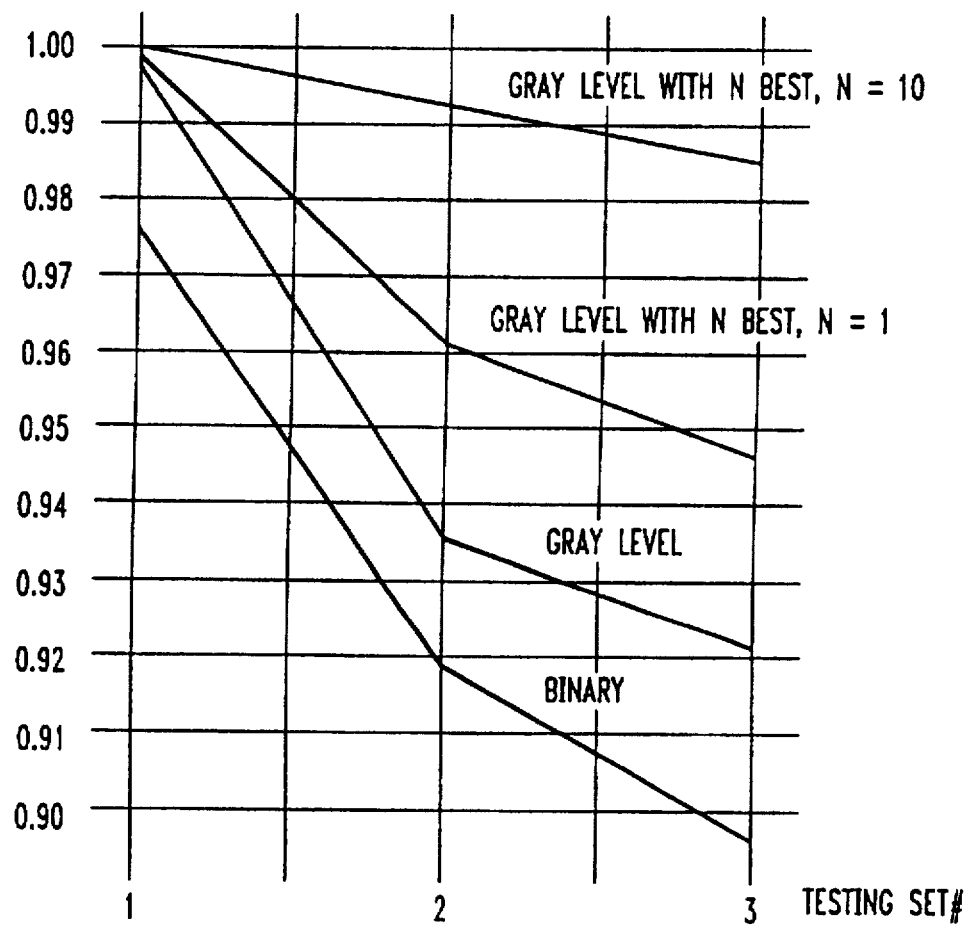
FIG. 10 is a flow chart setting forth a preferred method for processing the path stack of FIG. 8.

The results of the experiment are shown in FIG. 10. Upon examining FIG. 10, it is apparent that:

The gray level approach improves the performance of the OCR by more than 2% in the similarly degraded data set as the training set. As the word becomes more noisy and blurred, the superiority of the gray level approach becomes more obvious.

The N-best hypotheses approach greatly boosts the performance of the gray-level system, not only in significantly improved accuracy rate, but also in the increased robustness of the system.

The N=1 is a special case for the N-best search. Since N=1, there is no optional hypotheses for postprocessing, only one optimal output after the backward search. The value of this experiment is to show that a great performance improvement can be achieved by getting the best duration-corrected candidate, without any postprocessing being required. This proves that the backward duration correction plays a very crucial role in the performance improvement of this enhancement.

The N-best hypotheses approach has proven to be very efficient in improving the recognition performance. With only N=10, we have significant recognition rate and robustness improvement. More improvement is expected with larger N. One point worth notice is that, according to our experimental results, almost half of the improvement was done in N=2 or 3. This further confirm its superiority in efficiency.

The gray-level approach brings big performance improvement with almost no computation increase and small memory space increase. The memory space increases only for one of the observation components, which is a very small portion compared to the space necessary for the path search. As to the computation, for the discrete case here, table look-up was employed to find the observation probability, so whether there are 2 or 200 levels, the number of levels does not make much difference.

In the observation vector, only one component is actually gray-level-unique. All the others are the same for both a binary and a gray-level system. More improvement could be expected if more of such gray-level features are added.

An alternate embodiment for applying duration penalty to acquired images is to use the original global N-best hypotheses search, without duration consideration in either forward or backward search. After all the hypotheses are found, duration probabilities for each hypothesis are incorporated in postprocessing. In experiments performed using with this approach, for most of the cases where the recognition failed in the conventional Viterbi recognition scheme, the correct hypothesis usually won't result in the N-best search either, until N goes very large, e.g. N=50. This greatly increases the computation and degrades the effectiveness for this hypotheses search approach, which was intended to improve recognition rate by imposing postprocess on those hypotheses and find the correct hypotheses. That is the advantage of the approaches described above. By incorporating duration penalty first in forward Viterbi search and then backward, duration correction could eliminate hypotheses with unreasonable matching. This way only the more plausible words, i.e., words with similar number of characters and/or similar topology, would be found. This is especially important when working on poorly-printed document images.

Pseudo Two-Dimensional HMM with Duration Constraints

For details about the (1D) HMM, please refer to reference [3]. Here we only use FIG. 11 to show the correspondence when using a 1D HMM to model a string of pixels.

Figure 11:
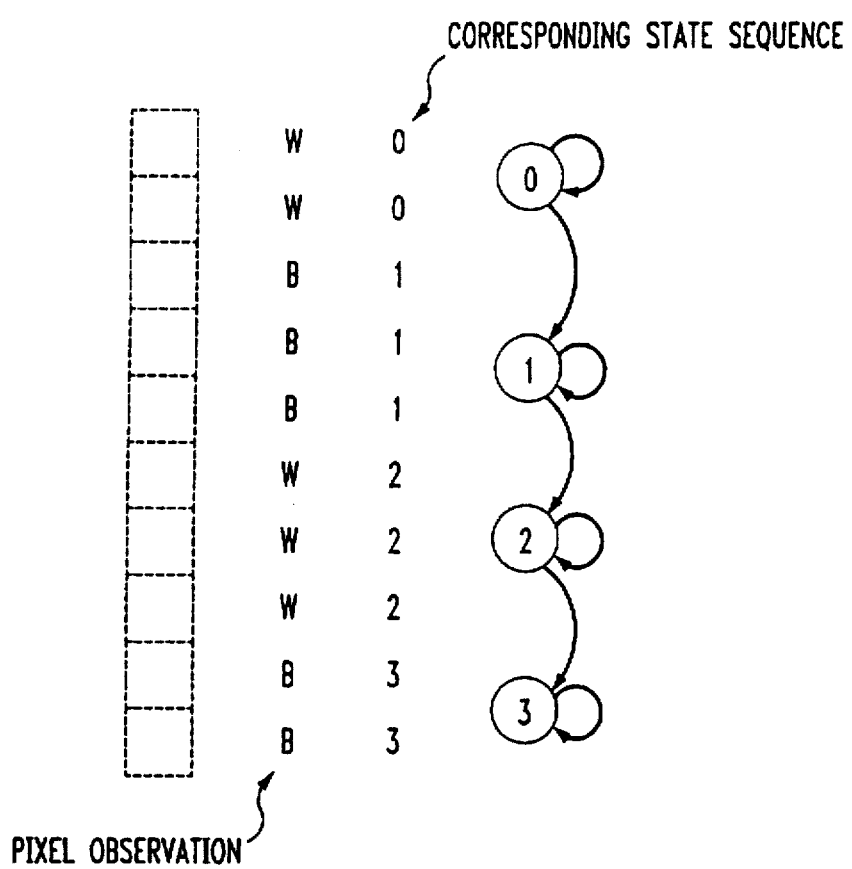
FIG. 11 is a state sequence diagram showing the correspondence between a 1-dimensional HMM and a string of pixels.

In FIG. 1, we have an extension of the pixel string in FIG. 11 into a 2D image. The state diagram underneath it represents the corresponding extension of the 1D HMM into the "Pseudo-2D" HMM. "Pseudo" in the sense that it is not a fully connected 2D network, but, still flexible enough to represent 2D word images. We call the big ovals the "superstates". Each superstate is a 1D HMM itself. The name "superstate" comes in the sense that it acts in the 2D model like a state in the 1D case, but contains much more information than the mere state in 1D model. The number sequence underneath the character image represents the possible superstate transition sequence to generate those corresponding columns as their observations. In other words, superstates generates columns as their observation units. Within each superstate, states of the 1D HMM corresponds to those pixels within each columns as in FIG. 11, i.e. those pixels are states' observation units. For detailed description of the PHMM, please refer to reference [6].

A PHMM can be completely specified by a set of parameters with the following description. For the clearness of the expression, we omit the model index here, with an understanding that different PHMM will have the same set of parameters with different values. 1. N, the number of superstates in the model. In our application, N is determined by the topology of the image. For example in FIG. 1, by grouping similar columns together, a PHMM with three superstates should be sufficient to characterize the character. 2. D: Duration probability for character. Assume m is the duration of the character, then D(x)=P(m=x) where m is in unit of columns. 3. $D_i$: $D_i$,$0 \leq i \leq N-1$;, the duration probability for superstate. If m is the duration for superstate i, then $D_i(x)=P(m=x)$ m is also in unit of columns. 4. $A=a_{ij}$: $0 \leq i \leq N-1$; $i \leq j \leq 1$, the superstate transition probability distribution. As shown in FIG. 1, a superstate transition happens when we moves from column to column (from left to right in our case). If we assume $S_k$ is the superstate for column k, then $a_{ij}$ could be defined as $$a_{ij}=P(S_{k+1}=j|S_k=i), \forall 0 \leq i \leq N-1; \; \leq j \leq i+1; \; \forall k$$

In our application, skipping over even one superstate is not allowed. In other words, only transition into next superstate or to itself is possible. 5. $\Lambda=\{\lambda^j: 0 \leq j \leq N-1\}$, the parameters set for specifying the vertical 1D model within each superstate (oval). For the jth superstate, $\lambda^j$ consists of:

$N^j$, the number of states for the 1D HMM within superstate j. Similar to N, $N^j$ is also determined by the topology of the character.

$D_i^j=\{D_i^j|0 \leq i \leq N^j-1, \}$ duration probability for each state. If m is the duration for state i in superstate j, then $D_i^j=P(m=x)$; where m is in unit of pixels.

$A^j=\{a_{ki}^j: 0 \leq k \leq N^j-1; k \leq i \leq k+1\}$. If we define that the state k in superstate j is $s_k^j$, and the state of the pixel at coordinate (x, y) is $q_{xy}$, then $$a_{ki}^j=P(q_{x,y+1}=s_i^j|q_{x,y}=s_k^j), \forall 0 \leq k \leq N^j-1 \; ; k \leq i \leq k+1;$$

$B^j=\{b_i^j(O_{xy}):0 \leq i \leq N^j-1\}$, observation probability of having $O_{xy}$ as an observation vector, being in state i of superstate j. In other words, $b_i^j(O_{xy})=P(O_{xy}|q_{xy}=s_i^j)$ where $O_{xy}$ is the observation vector for pixel at location (x, y). Note that there is no B parameters for each model at superstate level. The reason will be clear from the following discussion.

Feature Extraction

The observation vector $O_{xy}$ for each pixel located at (x, y) has three components:

The first component of the observation vector, $O_{xy}^1$, is calculated as:

$$O_{xy}^1 = \sum_{x=-1}^{1} \sum_{y=-1}^{1} m_{i-x,j-y} \cdot c_{xy}$$

where $m_{i,j}$ is the gray-level of the pixel at (i, j), $c_{xy}$ is from a 3 pixels by 3 pixels kernel. The weightings of the kernel were shown in FIG. 4. In another words, we use this kernel to convolve with the whole image.

The purpose is to reduce the effect of randomness on the grey level value caused by noise. In other words, the surrounding pixels are also contributing to the feature evaluation for the center pixel. The resulting gray level value of the pixel (from 0 to 255) is then quantized into 100 levels.

The second component is the relative position of each pixel in the columns. We assume that after layout analysis of the document, the position of baseline and the difference between topline and baseline are known. (See FIG. 3 for definition of topline and baseline). The actual value of the second component is $$\text{second component} = \frac{\text{distance (in pixels) from the feature pixel to baseline}}{\text{distance from topline to baseline}}.$$

It is then quantized into 50 levels. Obviously, the value could be negative for part of g, p, q, the location of each pixel in the column regardless of the point size of the printed characters. In this way, the feature could be more robust in different applications.

The third component value is the direction of the major stroke in which the pixel resides. We threshold the whole image (the threshold algorithm is explained in the experimental setup). For each pixel, we compute the length of strokes (in terms of continuous black pixels) in four directions: 0 degree, 45 degree, 90 degree, 135°, and choose the longest one that passes the pixel as its major stroke direction, and the 5th "direction" is for background pixels, which have no definition for direction or stroke. This component thus has five distinct values.

The Nested Viterbi Algorithm for PHMM

Figure 12:
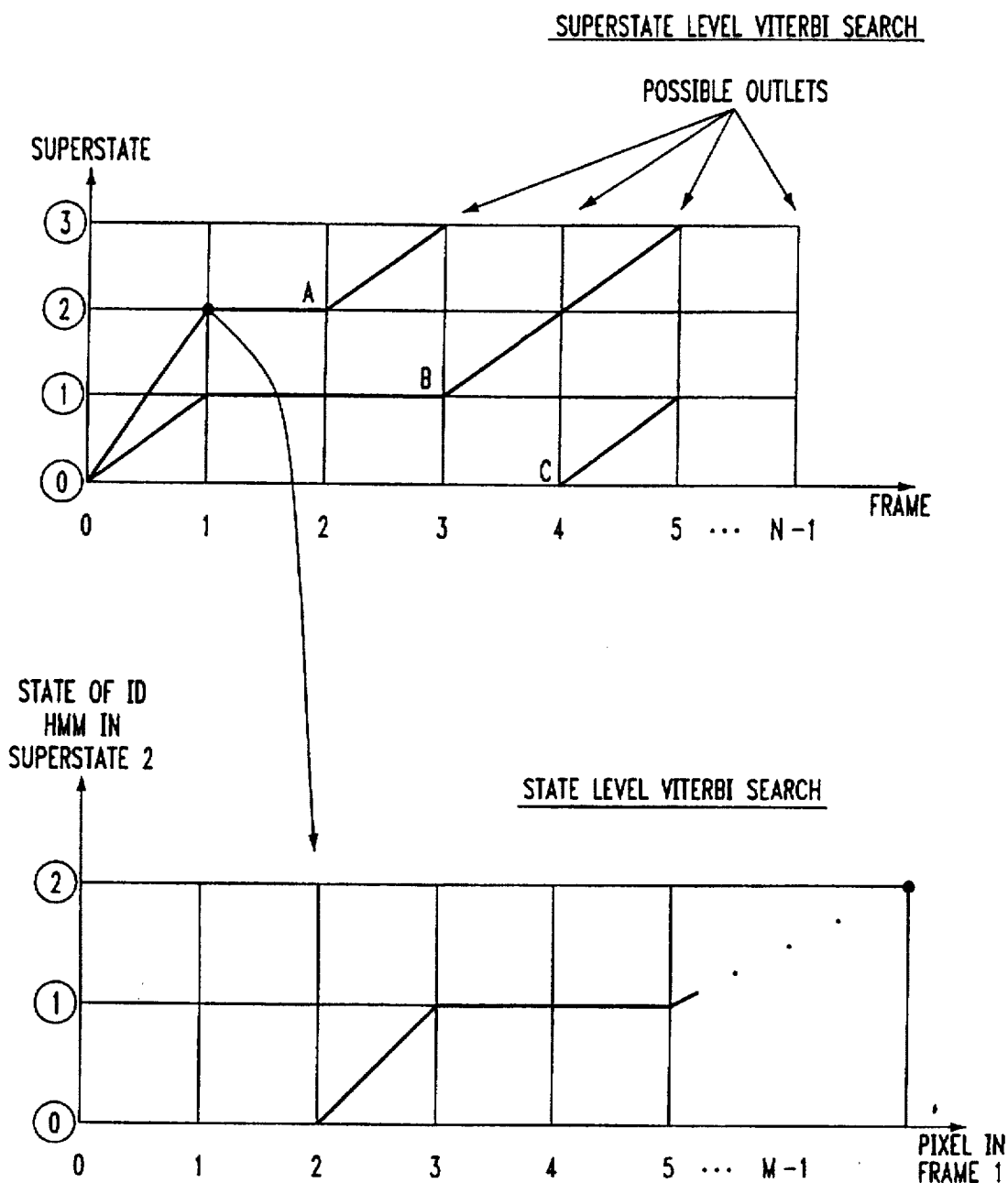
FIG. 12 is a path mpa of a nest Viterbi search.

The fundamental structure of Viterbi decoding algorithm can be found in many literatures, such as references [3] and [4]. FIG. 12 shows three paths among others obtained after a completed Viterbi search with PHMM.

This Viterbi search is performed between a complete word image (with N frames/columns) and a PHMM with four superstates. Each path represents a possible match between the model and the image. If we assume that $b_j(O_i)$ is the likelihood that observation of column i is generated by superstate j, and $a_{kl}$ is the superstate transition probability from superstate k to l, then the likelihood of path A should be: in $-\log()$ scale $$b_0(O_0)+a_{02}+b_2(O_1)+a_{22}+b_2(O_2)+a_{23}+b_3(O_3)+a_{33}+b_3(O_4)+a_{33}+b_3(O_5)+ \ldots +a_{33}+b_3(O_{N-1})$$

To find $b_j(O_i)$, the likelihood of generating column i by superstate j, we should first find the best match between the 1D HMM within superstate j, and the pixels of column i. This is exactly where the state level Viterbi search fits in, as shown in lower part of FIG. 5. It is another Viterbi search between 1D HMM of the 2nd superstate and the pixels within the first column. It gives the likelihood of this column generated by this superstate (or by this 1D HMM). This optimal path likelihood score of the state level Viterbi search is exactly the likelihood score $b_2(O_1)$ needed in the previous equation. So we have:

$$b_2(O_1)=b_0^2(O_{10})+a_{00}^2+b_0^2(O_{11})+a_{00}^2+b_0^2(O_{12})+a_{01}^2+b_1^2(O_{13})+a_{11}^2+b_1^2(O_{14})+ \ldots +b_2^2(O_{1,M-1})$$

where M is the total number of pixels in one column. In other words, in the superstate level Viterbi search, every time we need $b_j(O_j)$, we will initiate a nested state level Viterbi search to find this likelihood score. That is the reason why we called it a nested Viterbi search.

To be noted is the difference between $b_i(O^j)$ on the left side of the equation above, and $B^j=b^{ji}(O_{xy})$ on the right side. The former is the likelihood of a column generated by the 1D HMM in a superstate. This likelihood is different from column to column, infinite in the number of possible values; the latter is the likelihood of a pixel generated by one state, which is finite in the discrete observation case, and could be in parametric form in continuous case through training. Thus, the latter is part of the model parameter, and the former is not (at least in practical sense). This nested Viterbi algorithm is a crucial part of the training and recognition process.

In simple words, a nested Viterbi algorithm for PHMM is the major one dimensional Viterbi search, from left to right, column by column, to find the best match between the word image and models; where between each column of the image and each superstate of each model, another one dimensional Viterbi search is engaged, from top to bottom, pixel by pixel, to find the best match between pixels and states within each column. This nested structure is clearly shown in FIG. 12, where the upper part is the main Viterbi search between the image and PHMM, and the lower part shows where does the 1D search fit in. The Viterbi search progresses from left to right, until the last frame is finished. The overall likelihood of the image being generated by the PHMM is obtained.

The Level Building Algorithm for PHMM

For connected character recognition, a word image has to be matched with all possible combinations of PHMMs from all characters. The "level building" algorithm of reference [9] provides a structure to find the optimal combination.

Figure 13:
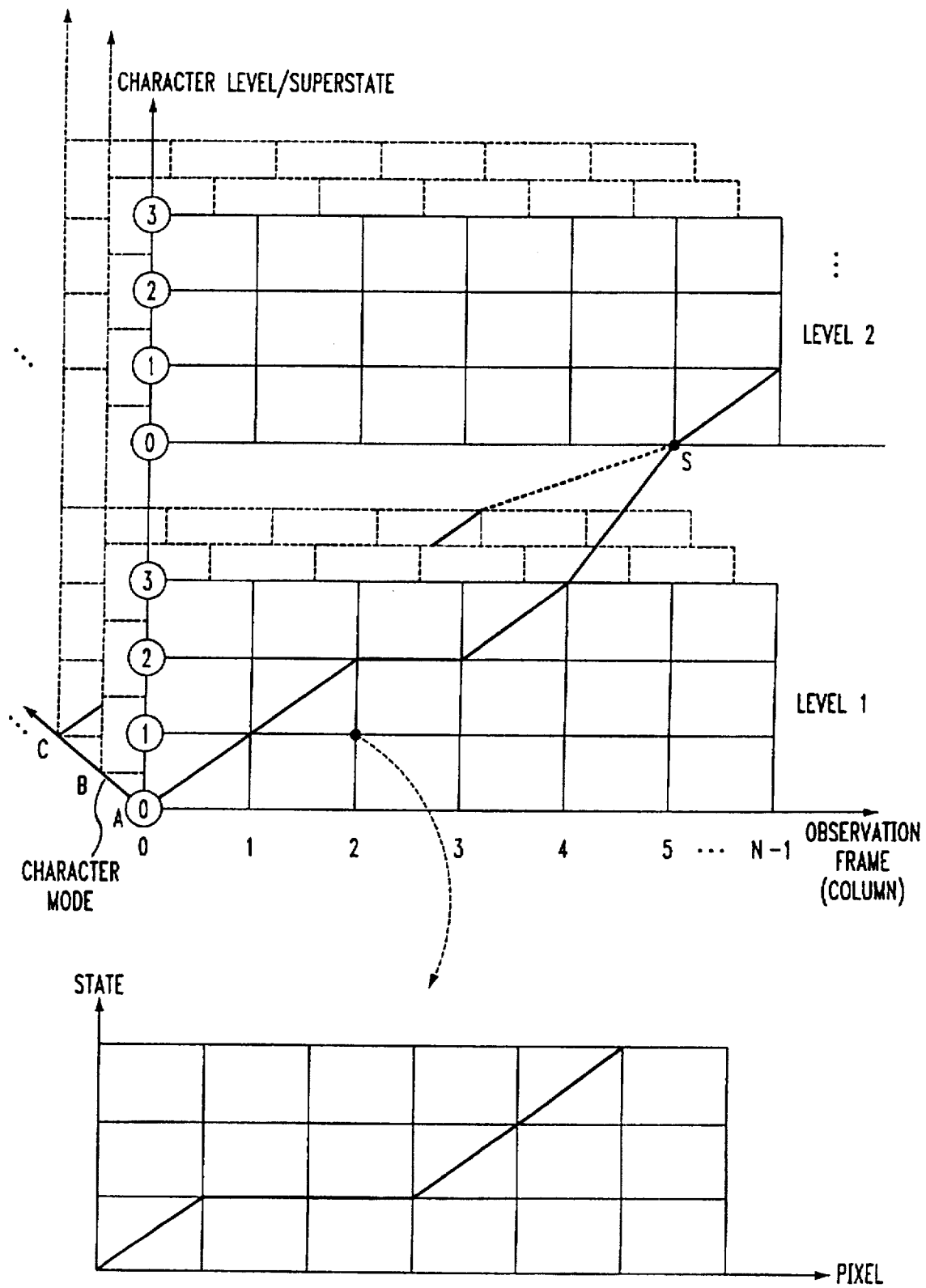
FIG. 13 sets forth the data structures generated by a level building algorithm which uses a nest Viterbi search.
Figure 14:
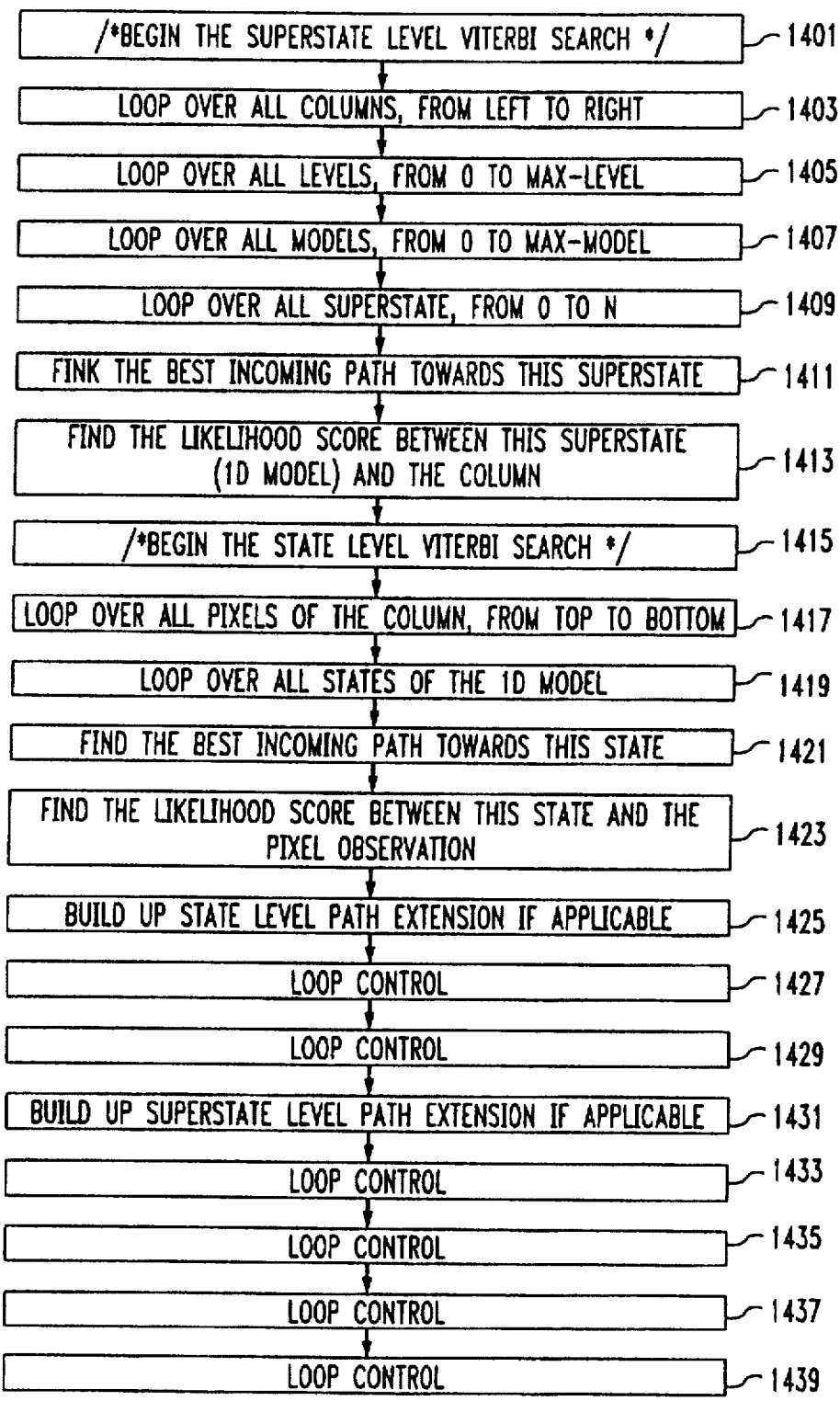
FIG. 14 is a flowchart setting forth procedures for a superstate level Viterbi search.

As shown in FIG. 13, when a Viterbi search path went through one level, it means that a match between a section of frames and a HMM has been found. Outlet points, as shown in FIG. 12, are the possible ending points of such matches within one level. FIG. 13 is an extension of FIG. 12 by adding one more dimension for accommodating all possible character models, and building levels to search for the optimal model combination. An outlet point of model "a" at frame 4 is concatenated by another match of model "a" at level 2, from frame 5 and up. This path then represents a possible recognition of character "a" from frame 0 up to 4 and then another "a" from frame 5 and up. Most of the time, for each starting point (i.e. the first node of a prospective new path in each level, such as S in FIG. 13), there might be more than one model which has outlet point available in the previous frame and previous level for the starting point to choose from. Similar to the rule for selecting incoming path for each node in the Viterbi algorithm, the rule for selecting an outlet to continue the path is:

For a path to be started at superstate O of model i at level j+1 and frame k+1, the best outlet point should have the minimum accumulated likelihood score among the last superstate of all model, at level j and frame k. That is, we first find out which character model should the optimal path coming from. Assume it is character model m, then m should satisfy $$m = \operatorname{argmin}_{m} \{ \cup [\text{like}(s_m, m, j, k), \quad 0 \leq m \leq M | \text{visit} = 1], \text{like}(O, m = i, j + 1, k) \} \quad (1)$$

where like(s, i, j, k) is the accumulated path likelihood from frame 0 up to frame k, at superstate s of model i and level j. $s_m$ is the last superstate of model m. M is the total number of models in this case. "visit =1" means that this node should have been reached by at lease one path to be qualified as an outlet node. Any path starting to develop in a new level should be looking for all the available outlets at previous frame and previous level, over all models. It should also compare them with the path coming in from the same model and same level. i.e. a path that might have been existing in this level started at some previous frame. The best incoming path among them will be picked as the origin of the new path. If we use FIG. 13 as an example, there are 2 outlets available at level 1, one at model "a", the other at "c", both at frame 4. After comparing them and the path coming in from frame 4 of model "a" in level 2 (if this path exist), we assume it picked the outlet at superstate 3 of model "a" at level 1, then starts developing in level 2. This path then brings the possible recognition of "a" from frame 0 to 4, and another "a" from 5 and up. If outlet at "c" is picked, the result would be "c" from 0 to 4 and "a" for 5 and up.

The summary of this level building algorithm with nested Viterbi search using PHMM is as follows:

/* Begin the superstate level Viterbi search */ (block 1401)

LOOP over all columns, from left to right (block 1403)

LOOP over all levels, from 0 to MAX-LEVEL (block 1405)

LOOP over all models, from 0 to MAX-MODEL (block 1407)

LOOP over all superstate, from 0 to N (block 1409)

find the best incoming path towards this superstate (block 1411)

find the likelihood score between this superstate (1D model) and the column (block 1413)

/* Begin the state level Viterbi search */ (block 1415)

LOOP over all pixels of the column, from top to bottom (block 1417)

LOOP over all states of the 1D model (block 1419)

find the best incoming path towards this state (block 1421)

find the likelihood score between this state and the pixel observation (block 1423)

build up state level path extension if applicable (block 1425)

LOOP CONTROL (block 1427)

LOOP CONTROL (block 1429)

build up superstate level path extension if applicable (block 1431)

LOOP CONTROL (block 1433)

LOOP CONTROL (block 1435)

LOOP CONTROL (block 1437)

LOOP CONTROL (block 1439)

The Incorporation of Duration Penalty in PHMM

Under the nested Viterbi search structure, if we want to incorporate duration penalty as part of the path search process, the likelihood should be updated along the path at each node as follows (reference [9]):

like(i,k) = max [like(i,t − 1) + a(i,i), like(i − 1,t − 1) + a(i − 1,i) + State (or superstate, character) Duration Penalty] + $b_i(O_k)$;

where $b_i$ ($b_{O_k}$) is the likelihood for node i (which could be superstate or state, as explained before) to generate observation $O_k$, like(i, k) is the path likelihood score accumulated up to node i and frame (or pixel) k, and the duration penalty is the minus log scale of the duration probability. In our application, the duration probability is found through training by calculating histogram of the length of the duration of states, superstates, and characters. The histogram for states is in units of pixels, and for superstates and characters are in columns. As one might notice in the equation, the duration penalty is added only when a transition occurs between different states, superstates or characters. The character duration penalty is added on top of the superstate duration penalty at the transition out of the last superstate of any character models. In this way, duration penalty could be incorporated in the forward search, instead of as a postprocess.

Our experiments show that this incorporation greatly improve the recognition performance. In N best approach, it can also give better word candidates, especially for those cases where the best candidate is not the correct one. It can also greatly reduce the search size for proper higher level postprocessing (e.g. dictionary check).

Back-Tracing

Figure 15:
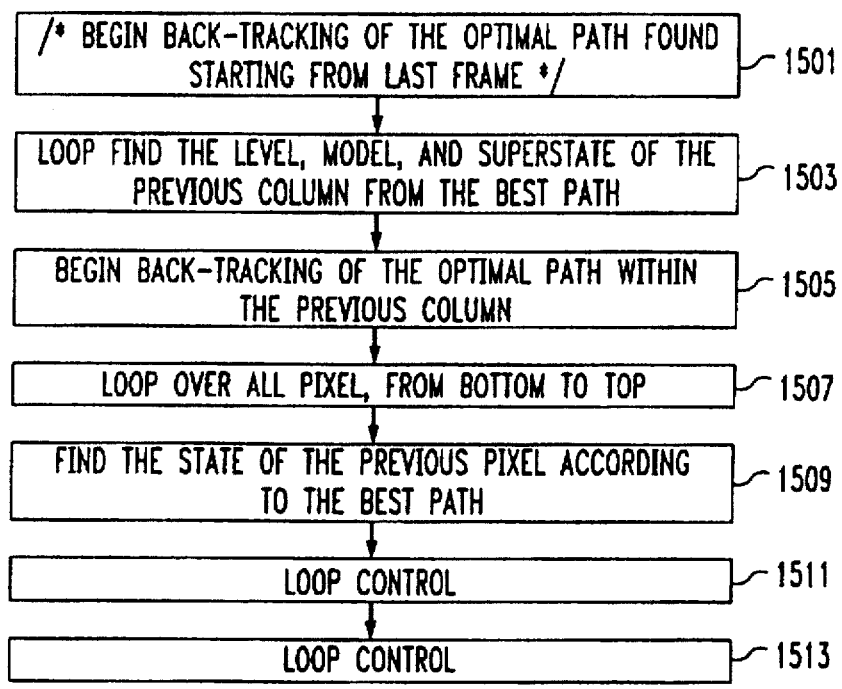
FIG. 15 is a flowchart setting forth a procedure for backtracking a path.

In our forward (left to right) Viterbi search process, at every node in superstate level, we record all the information necessary for future use. The necessary information might be different for training and recognition purpose. For recognition (without N-best search), all we have to know is how to trace the optimal path backward from terminal node to initial node. The terminal node of a path is located at the last superstate of a model, at the last frame of the observation. According to this definition, we will have one terminal node for every model at every level of the structure, as long as it has been visited by paths. We will compare the accumulated path scores of all these nodes, and the best (smallest) of them will be the terminal node for the optimal path. An initial node is just the opposite: it is the first node (superstate) at the first frame of the observation for a path. Obviously, if we trace back a path starting from a terminal node, it will end up at the initial node. Assume we have found the terminal node of the optimal path, then we need to know what is the previous node right before the current node if tracing backward along this optimal path. What level, model, and superstate does this previous node belong to? If the back-tracing is for training, we need to know exactly where does each model, superstate, state start and end, with precise pixel and column index, plus all the observation vectors generated by each state. Only in this way can we have all the information needed to update our models. The main purpose of back-tracing is to get frame by frame recovery of the optimal path in the superstate level, plus a pixel by pixel recovery of the optimal path in state level within each node of the superstate level optimal path. In a simpler expression, for Viterbi search initiated in both superstate and state levels, we should back-trace their optimal path to get information we need. The basic information we need from this process is the link information from the current node (superstate or state) to one node before along the optimal path. The exact usage of the information obtained in this process for training and recognition will be discussed in detail in the following sections. The summary of this back-tracing within a level-building structure is as follows (FIG. 15):

/*Begin Back-tracing of the Optimal Path Found starting from last frame */ (block 1501)

LOOP find the level, model, and superstate of the previous column from the best path (block 1503)

Begin back-tracing of the optimal path within the previous column (block 1505)

LOOP over all pixel, from bottom to top (block 1507)

find the state of the previous pixel according to the best path (block 1509)

LOOP CONTROL (block 1511)

LOOP CONTROL (block 1513)

Training

Figure 16:
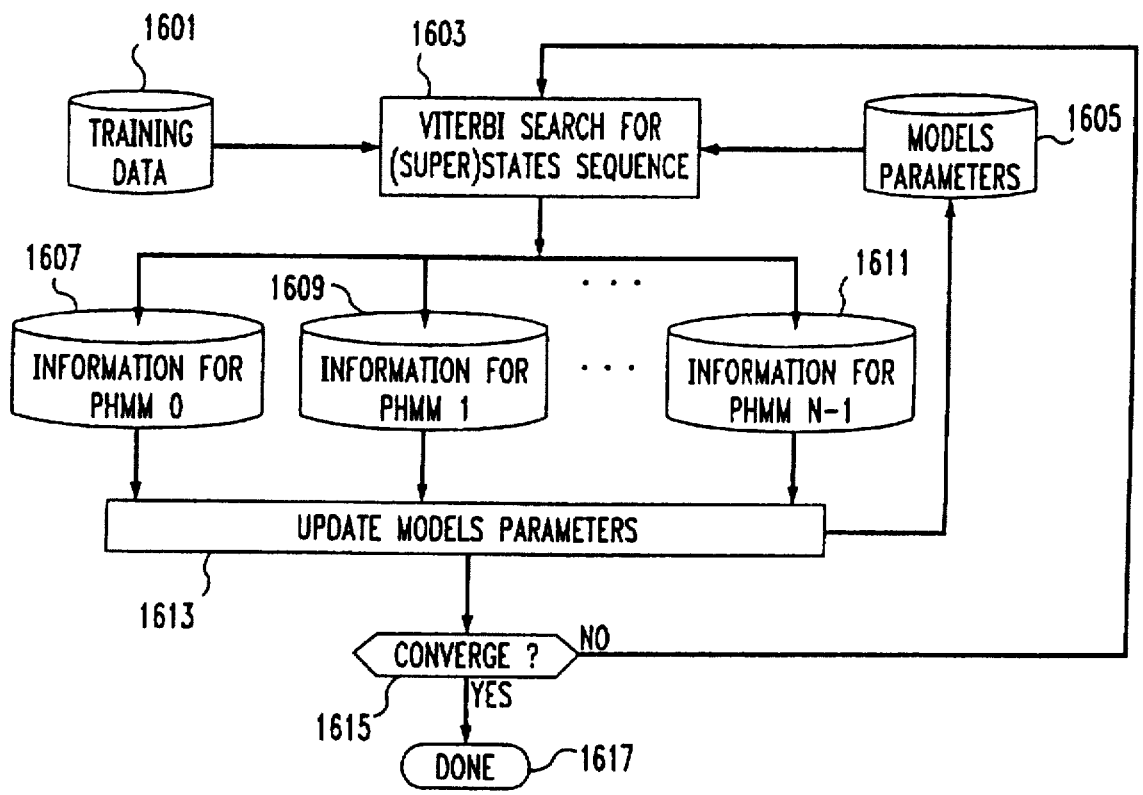
FIGS. 16 and 17 are flowcharts setting forth various training procedures.
Figure 17:
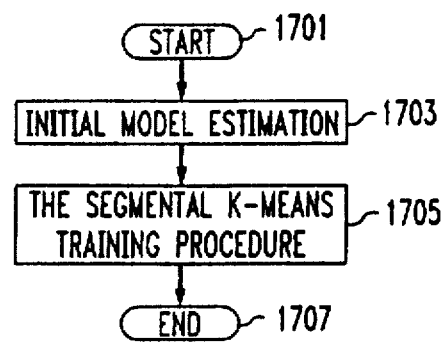
Figure 18:
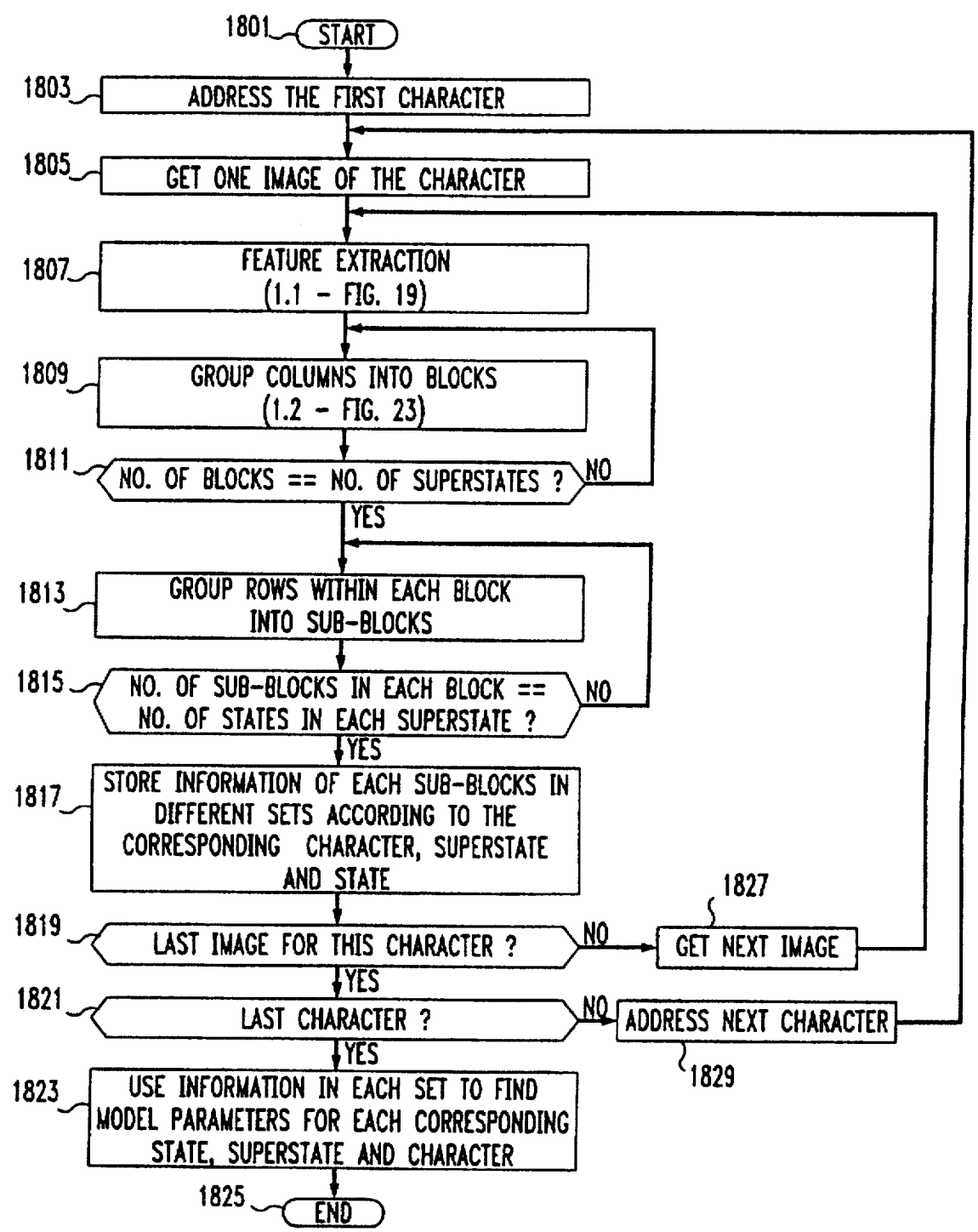
FIGS. 18–23 are flowcharts setting forth procedures used for initial model estimation.
Figure 19:
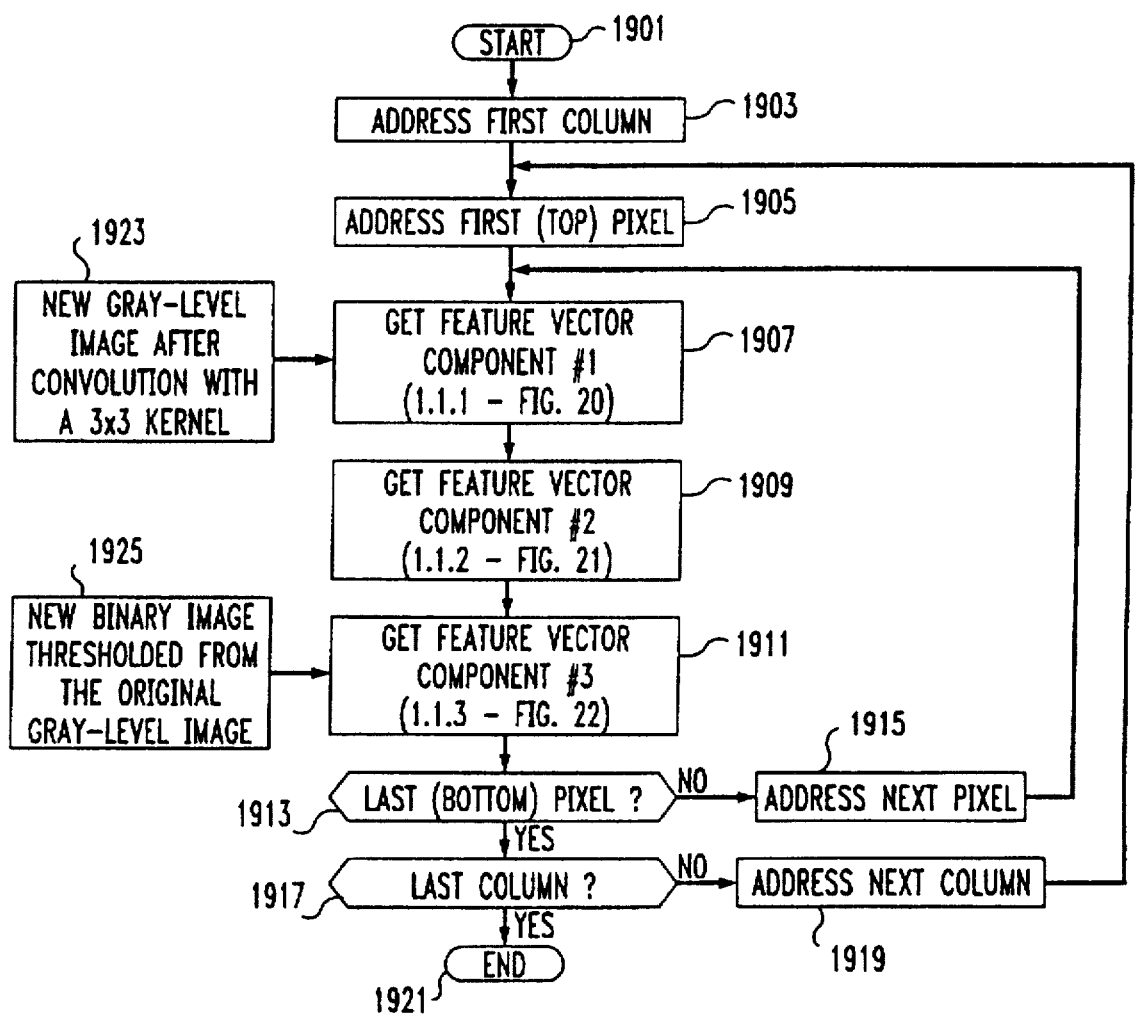
Figure 20:
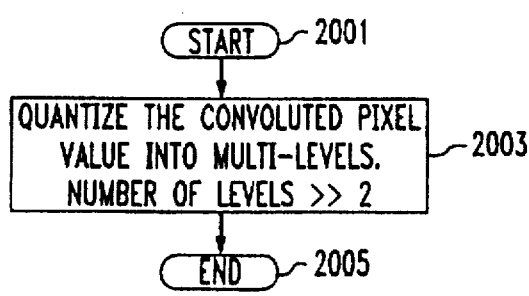
Figure 21:
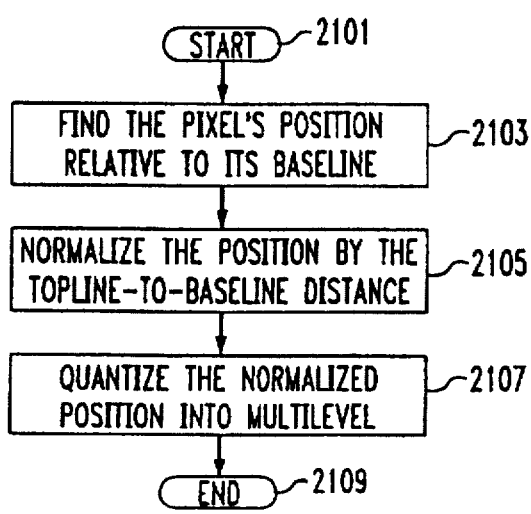
Figure 22:
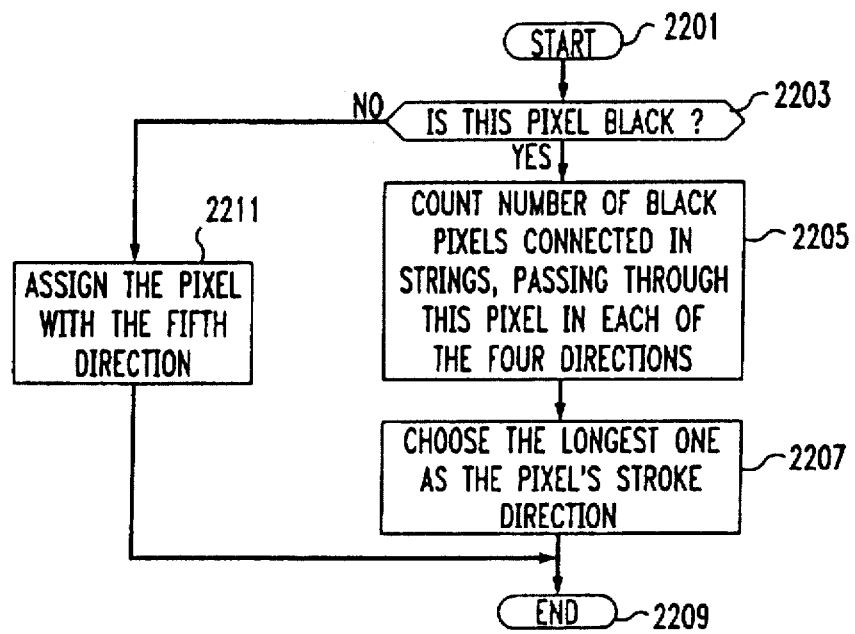
Figure 23:
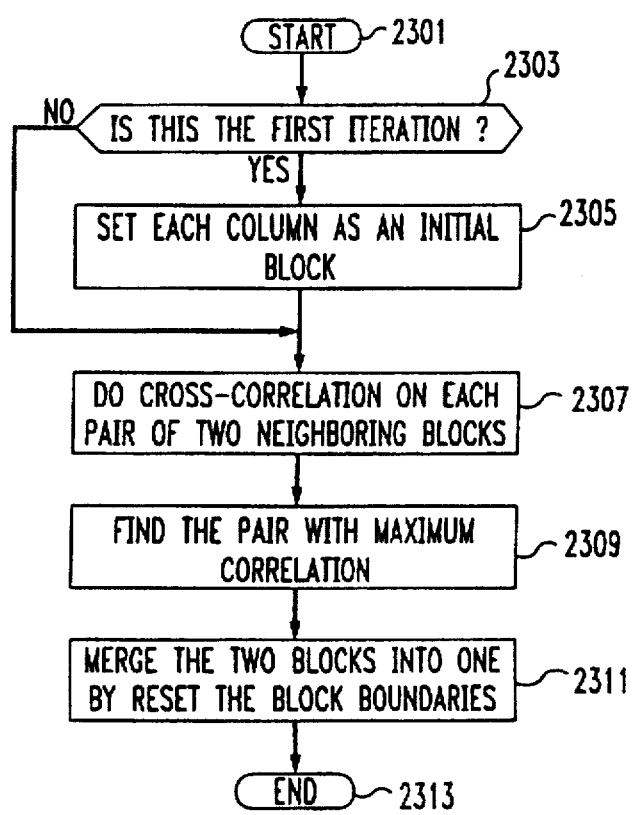
Figure 24:
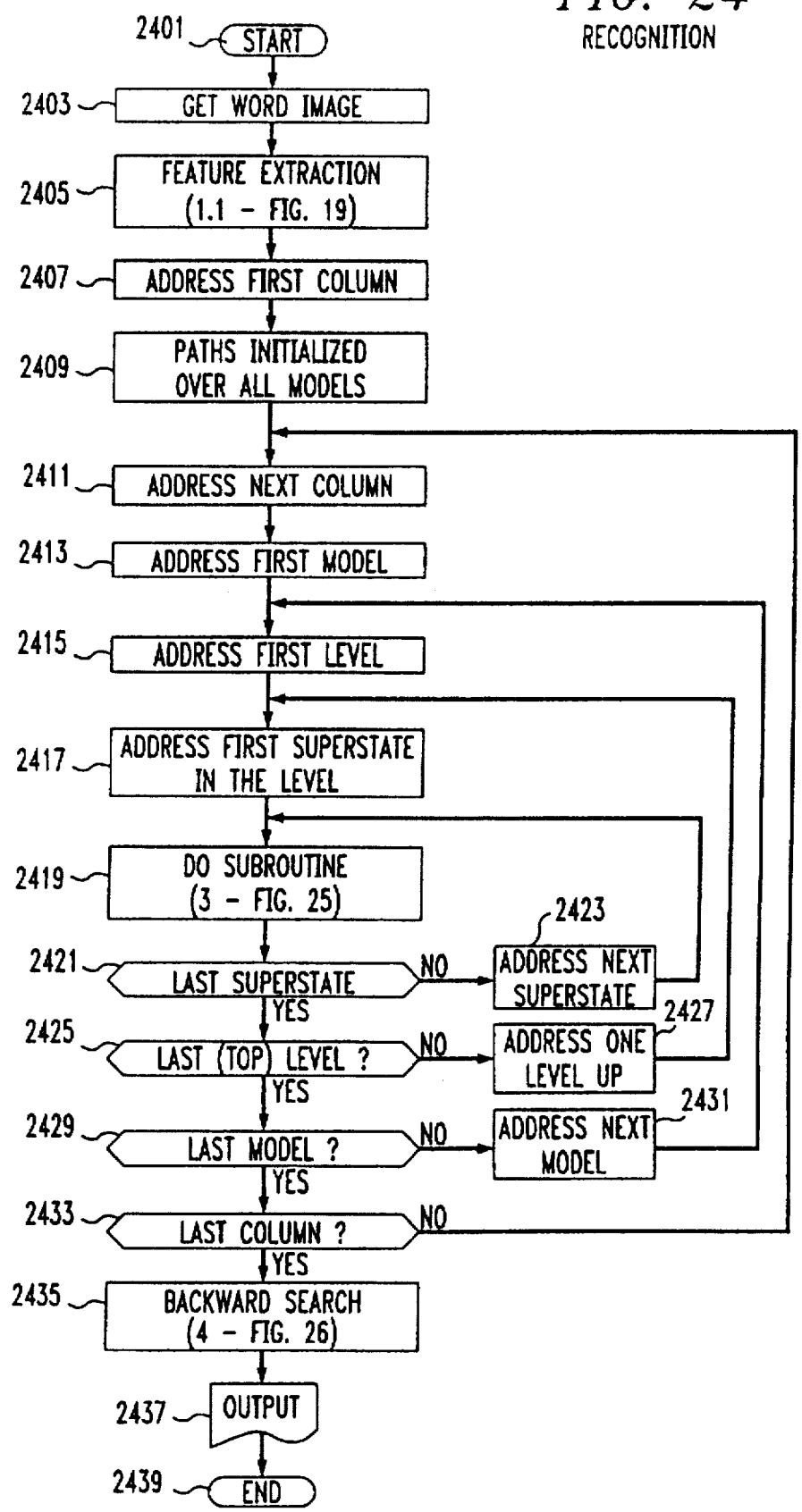
FIGS. 24–26 are flowcharts setting forth procedures used for character recognition.
Figure 25:
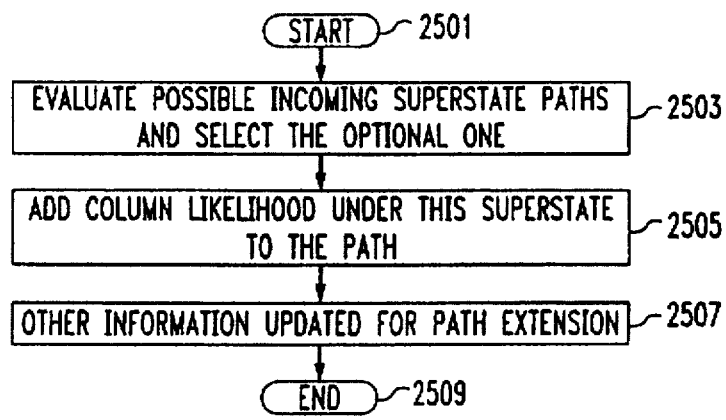
Figure 26:
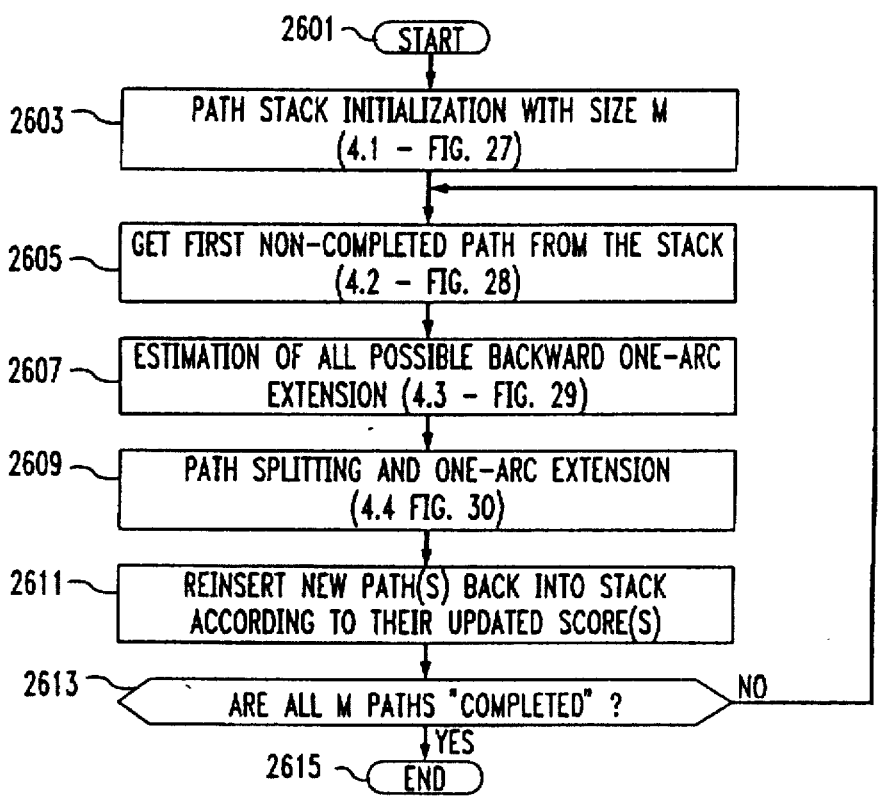
Figure 27:
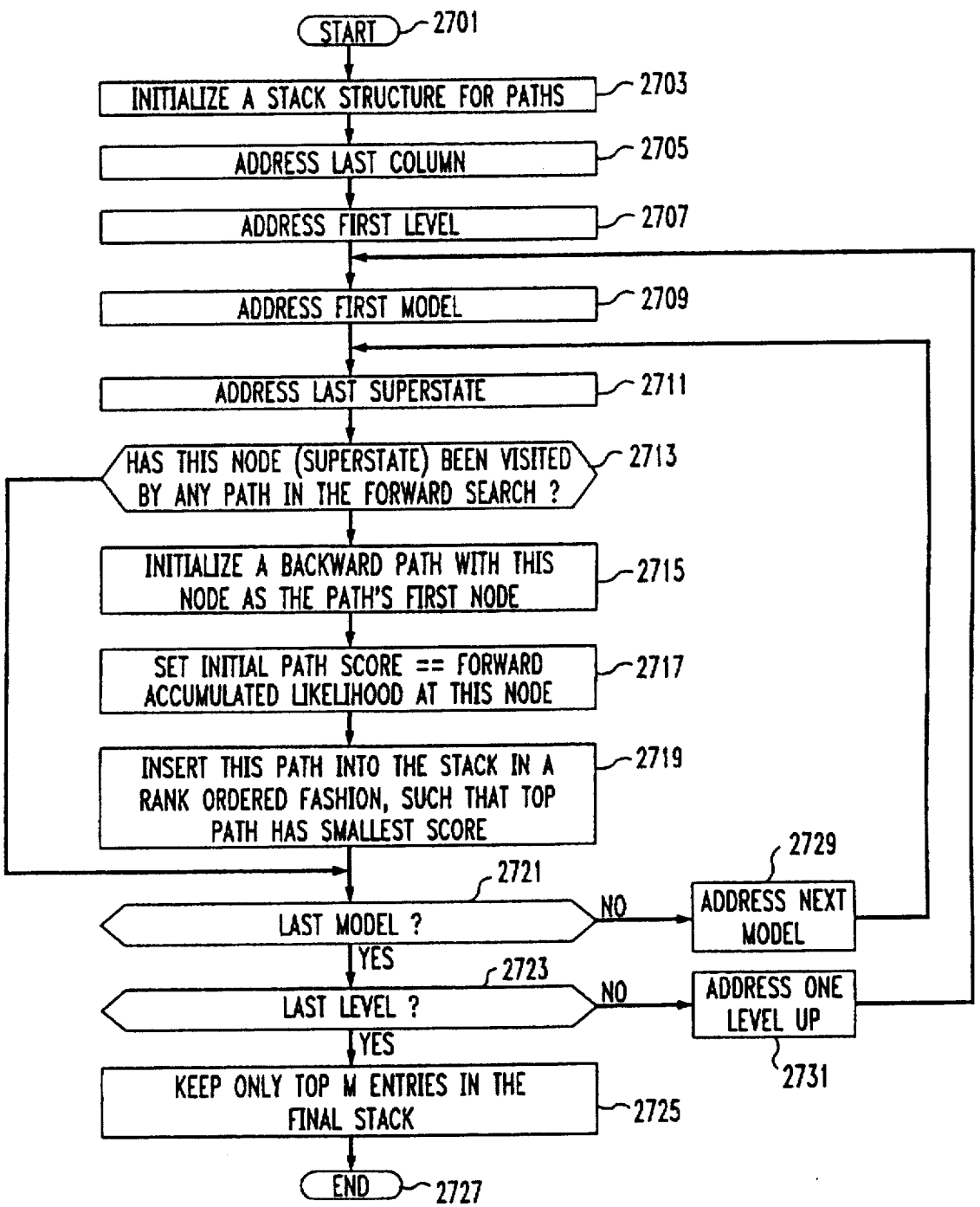
FIG. 27 is a flowchart setting forth a procedure for path track initialization.
Figure 28:
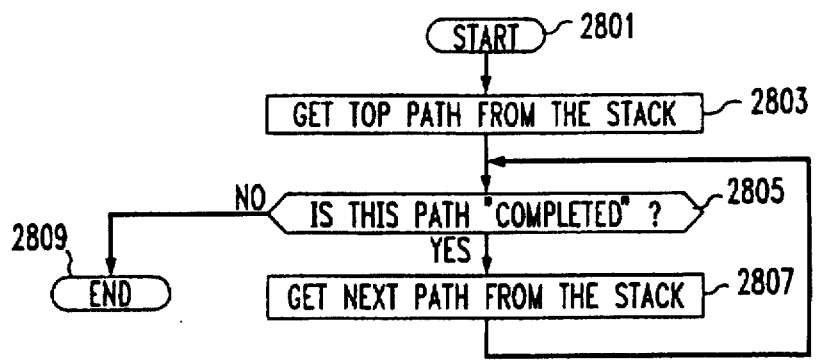
FIG. 28 is a flowchart setting forth a procedure for obtaining a first noncompleted path from the path stack.
Figure 29:
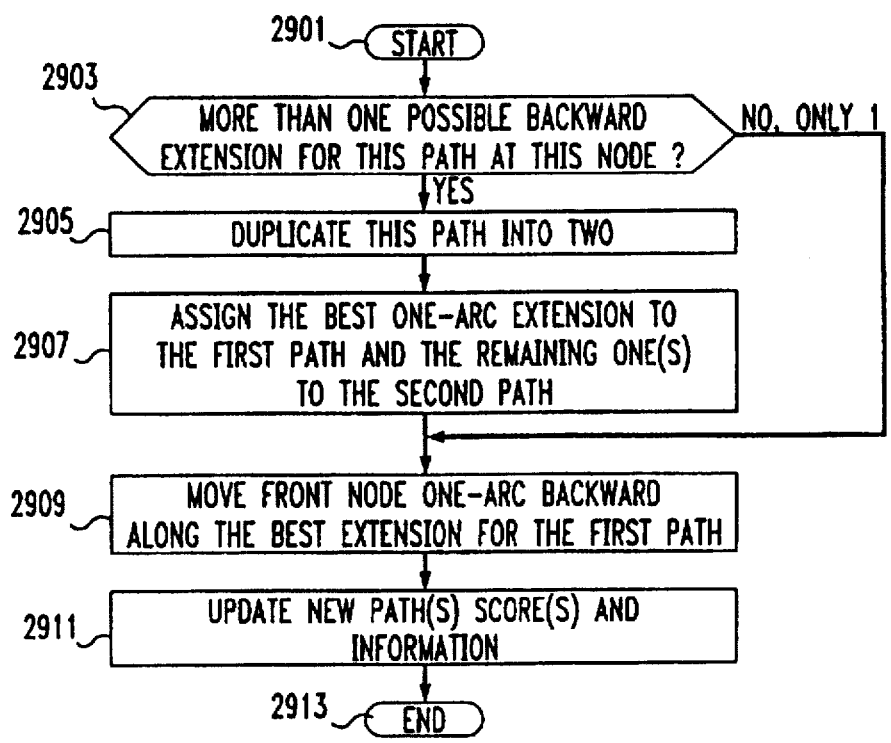
FIG. 29 is a flowchart illustrating a procedure for path splitting.
Figure 30:
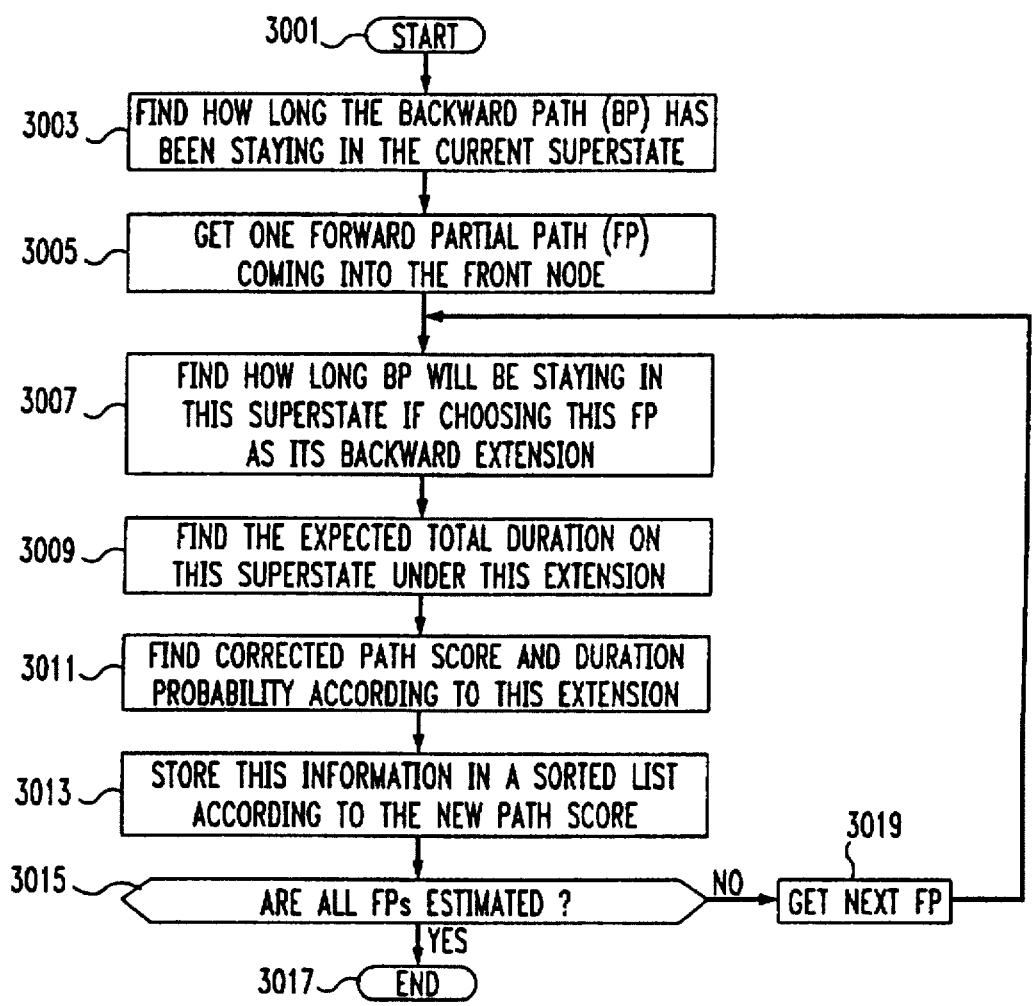
FIG. 30 is a flowchart setting forth a procedure for estimation of all possible backward one-arc extensions.

We use the segmental k-means training procedure as described in reference [10] to train our model. The block diagram is shown in FIG. 16.

The strong point of this training procedure is that it is unsupervised. Throughout the whole process, the goal is to use the current model to do path finding, or (super)state sequence segmentation, and then use the segmentation information to do model parameter estimation. We will then use this newly obtained models to do segmentation again. The whole process will be repeated until finally the parameter set converges within certain criteria, and a HMM is thus built for each character.

Before the training process begins, we should have an initial PHMM set to start the iteration. It could either be obtained from some existing models, or use segmentation method to get the initial PHMMs. This concept is discussed below.

Once we get the initial models, or any updated models during this iterated k-mean process, the models are used to get the (super)state sequence segmentation through optimal path back-tracing. Although we still use nested Viterbi search to find this optimal path, the level building is now not necessary. The reason is because we now know exactly what "word" is for each training image, which implies that choosing among outlet points at beginning of each level is now not necessary. All we have to do is then to cascade character models, according to their order in the word, to form a word model. Then we use the nested Viterbi search to find the best match between this word model and the word image. According to the algorithm structure, after the nested Viterbi search, the optimal path will show: a) at superstate level, where are the boundaries (in terms of column index) of each superstate and character. b) at state level, where are the boundaries (in terms of pixel index) of each state. The information is retrieved by back-tracing this optimal path in both superstate and state level. Once this segmentation information is obtained, we will be able to know exactly which model, superstate, and state does each pixel belong to. We then group pixel observation vectors according to this information. For example, for a three-character word, with five superstates in each character PHMM, and five states in each superstate, we will divide all pixel observation vectors in this word image into 3×5×5=75 different groups, one group for each state in each superstate of each character model. These observation vectors are all included in the "information for PHMM K" database, as seen in FIG. 16. Other information included are: (super)state transition counts, and character and (super)state duration records. We keep repeating this procedure until all training images (tokens) has been segmented. A reestimation process is then initiated to get a new set of models. For a model with parameter set {N, A, B, D, Lambda}, it can be reestimated as follows:

For character duration probability:

$$D(n) = \frac{\text{the number of training tokens of this character that have duration of } n \text{ columns}}{\text{the number of training tokens of this character}}$$

For superstate level parameters:

$$a_{kj} = \frac{\text{the number of transition from superstate } k \text{ to superstate } j}{\text{the number of all transitions start from superstate } k}$$

$$D_j(n) = \frac{\text{the number of tokens of superstate } j \text{ that has duration of } n \text{ columns}}{\text{the number of tokens of superstate } j}$$

For state level parameters for 1D HMM in superstate j:

$$a_{ki}^j = \frac{\text{the number of transition from state } s_k^j \text{ to } s_i^j}{\text{the number of transitions starting from state } s_k^j}$$

$$b_{im}^j(p) = \frac{\text{the number of vectors for state } s_i^j \text{ which have ovservation } p \text{ in the } m\text{th vector component}}{\text{the number of vectors in state } s_i^j}$$

-continued $$D_j^i(n) = \frac{\text{the number of tokens of state } s_j^i \text{ that has duration of } n \text{ pixels}}{\text{the number of tokens of state } s_j^i}$$

The final step in the training loop is the test for convergence as a criterion to stop the iteration. We compare the fitness of the alignment between the new model and the previous one by comparing their optimal path likelihood. If the variation of the likelihood score falls below certain threshold value, the final convergence is achieved. Otherwise, the whole segmentation-estimation loop will be repeated. Only at this following loop, the newly generated models will be used for the segmentation procedure.

Initial Estimation of PHMMs

As we have already mentioned, the number of superstates and states for each character model is determined by their topology. Let's use FIG. 6 as an example. In our experiment, we use the first strategy, with the number of final blocks decided by inspecting characters topology, and given before grouping process starts. After those vertical blocks of columns are formed, we then go to each vertical block to group rows within the block by using the same process as we did for columns. FIG. 6 shows the final grouping (cutting) for image "b". As can be seen in this figure, the character "b" can be represented by a PHMM with four superstates, and 3, 3, 5, 3 states within each superstate, respectively. The exact location as to where the cutting should be made is determined automatically through this iterated correlation comparison. This is specially important for gray level images with noise and blur, for its difficulty in make meaningful, efficient, and consistent segmentation (grouping) for different characters and samples by manual operation. For each character, the procedure is repeated for a few sample images. Based on the segmentation, we can then build an initial estimate of the PHMM for the character. Note that this procedure is only required when there is no initial estimates of PHMMs available to start the training process.

References

[1] O. E. Agazzi and S. Kuo, "Pseuod two-dimensional hidden markov models for document recognition," *AT&T Technical Journal*, vol. 72, pp. 60–72, September/October 1993.

[2] F. K. Soong and E.-F. Huang, "A tree-trellis based fast search for finding the n best sentence hypotheses in continuous speech recognition", in *Proc. DARPA Speech and Natural Language Workshop*, pp. 12–19, June 1990.

[3] L. Rabiner, "A tutorial on hidden markov models and selected applications in speech recognition", *Proceedings of the IEEE*, Vol. 77, pp. 257–286, February 1989.

[4] L. Rabiner and B. Juang, *Fundamental of Speech Recognition*, Prentice Hall, 1993.

[5] O. E. Agazzi and S. Kuo, "Hidden markov model based optical character recognition in the presence of deterministic transformations", *Pattern Recognition*, vol. 26, no. 12, 1993.

[6] S. Kuo and 0. Agazzi, "Keyword spotting in poorly printed documents using pseudo 2d hidden Markov models", *IEEE Trans. on PAMI*, in press.

[7] O. E. Agazzi, S. Kuo, El Levin, and R. Pieraccini, "Connected and degraded text recognition using planar hidden markov models", in *Proc. of ICASSP'93*, pp. V113–V116, 1993.

[8] L. Wang and T. Pavlidis, "Direct gray-scale extraction of features for character recognition", *IEEE Trans. on PAMI*, vol. 15, October 1993.

[9] C. Lee and L. Rabiner, "A frame-synchronous network search algorithm for connected word recognition", *IEEE Trans. Acoust. Speech Signal Processing*, Vol. ASSP-37, pp. 1649–1658, November 1989.

[10] L. R. Rabiner, B. H. Juang, S. E. Levinson, and M. M. Sondhi, "Recognition of isolated digits using hidden markov models with continuous mixture densities", *AT&T Tech. J.*, vol. 64, pp. 1211–1222, July/August 1986.

[11] J. Kittler and J. Illingworth, "Minimum error thresholding", *Pattern Recognition*, vol. 19, pp. 41–47, 1986.

The performance can be further improved by incorporating discriminative training. When checking the wrongly-recognized words in the experiment, almost all of these words are clustered in a so-called "confusion set". That is, characters are mistaken for other ones with similar topology, and these characters got more confusable when images are noisy and blurry. For example, set {e, c, o}, set {l, i, t}, or "d" mistaken as "cl"; thus, the N-best search may be utilized to find out words that closely resemble the correct word. If discriminative training is used to train the models with this competitive (confusable) set, it could greatly reduce the error rate of recognition. This motivation could be confirmed by the N-best hypotheses approach results. Most of the words found in the hypotheses list, i.e. those that are considered top competitive to the correct one, are mostly combination of characters from the confusion set.

In summary, the utilization of gray-scale imaging in combination with pseudo 2-dimensional Markov modeling provides significant improvement over binary systems, especially for degraded and connected word images. An N-best hypotheses search with duration constrain is introduced to further improve the system. The duration constrain is first imposed in the forward Viterbi search as added penalty, then is combined with the path map obtained in the forward pass to do the duration penalty correction in the backward search. Experimental results have proven the superiority of the system in the form of greatly improved recognition rate, and robustness over widely changed applications.

The invention has been shown and described with reference to particular embodiments. However, it will be understood by those skilled in the art that various changes may be made therein without departing from the spirit and scope of the invention.

We claim:

1. A method of determining the identity of unknown text elements in a document comprising the following steps:

(a) for each of a plurality of visual images, each visual image representing a text element, generating a corresponding two-dimensional stochastic model for that text element;

(b) scanning the document to create a gray-level pixel map for each of a plurality of unknown text elements; and (c) for each unknown text element:
comparing gray-level pixel data of the pixel map for the unknown text element with each of a plurality of stochastic models to determine, for each such stochastic model, a probability that said stochastic model represents said unknown text element, wherein said gray-level pixel data is quantized into more than two gray-scale values, and
determining the identity of said unknown text element as the known text element associated with the stochastic model for which said probability is highest.

2. The method of claim 1 wherein said stochastic models are pseudo two-dimensional hidden Markov models, each said model containing at least one superstate, and each said superstate contains at least one state.

3. The method of claim 2 wherein said superstates represent substantially vertical slices through the text elements represented by said hidden Markov models and each comparing step comprises the steps of:

(a) combining each of a plurality of respective columns in said pixel map with a corresponding superstate;

(b) for each combination of a column in said pixel map and a superstate, determining a best path for said column through a plurality of states in said superstate, and determining a probability for the final state in said superstate; and (c) for each of the probabilities determined in step (b), determining a best path through said superstates, determining a probability for the best path through said superstates and using the path through the superstates having the highest probability to determine the identity of text elements corresponding to the pixel map, wherein the path through the superstates having the highest probability is termed the final superstate.

4. The method of claim 3 wherein step (c) uses the probabilities determined in step (b) to calculate N probabilities for the final superstate, the N probabilities representing N best hypotheses of text elements for the final superstate.

5. The method of claim 3 wherein each said hidden Markov model includes self-transition probabilities for the states and superstates in said model, the method further comprising:

in said model generating step, estimating a mean duration and a standard deviation for each state and superstate in said hidden Markov model, in step (a) and in step (b), storing the best path through said states and superstates in a memory;

adjusting said determined probabilities determined in steps (b) and (c) by extracting duration constraints based upon said self-transition probabilities, and inserting these duration constraints based on a mean duration and a standard deviation for each state and superstate along said best path.

6. The method of claim 5 wherein said adjusting step further comprises:

during step (b), (i) adjusting the probability for the final state in each superstate by extracting duration constraints based on self-transition probabilities, and (ii) inserting duration constraints based on the relevant mean durations and standard deviations for the states in said superstate along the best path; and during step (c), (i) adjusting the probability for the final superstate by extracting duration constraints based on self-transition probabilities, and (ii) inserting duration constraints based on the mean durations and standard deviations for each superstate.

7. The method of claim 3 further comprising:

before said adjusting step, calculating at least one adjustment parameter relating to at least one difference between said unknown text element and the known text element represented by said hidden Markov model; and incorporating said at least one adjustment parameter in said adjusting step.

8. The method of claim 3 further comprising:

during step (b), calculating at least one preliminary adjustment parameter relating to at least one difference between said unknown text element and the known text element represented by said hidden Markov model, adjusting the probability for the final state in each superstate by extracting duration constraints based on self-transition probabilities, inserting duration constraints based on the mean durations and standard deviations for the states along the best path in said superstate and incorporating said at least one preliminary adjustment parameter, during step (c), calculating at least one overall adjustment parameter relating to said at least one difference, adjusting the probability for the final superstate by extracting duration constraints based on self-transition probabilities and inserting constraints based on the relevant mean durations and standard deviations for said superstates and incorporating said at least one adjustment parameter.

9. The method of claim 8, further comprising:

after step (c), readjusting said adjusted probability by substituting said overall adjustment parameter for each preliminary adjustment parameter.

10. The method of claim 7 further including the steps of:

(a) subdividing the gray-level pixel map into a plurality of portions including a first portion and a second portion; and (b) comparing the first portion to a plurality of stochastic models, wherein the stochastic models are two-dimensional hidden Markov models, to identify a closely-matching two-dimensional hidden Markov model from the plurality of two-dimensional hidden Markov models that most closely approximates the first portion.

11. The method of claim 1 wherein the document is represented in binary form, the method further including the steps of:

(a) subsampling the binary document to generate a gray-scale image by mapping binary n×n space to gray-scale m×m space, wherein m is greater than n, and m and n represent the number of dimensions in a multidimensional space;

(b) subdividing the gray-scale image into a plurality of portions including a first portion and a second portion; and (c) comparing the first portion to a plurality of two-dimensional hidden Markov models to identify a closely-matching two-dimensional hidden Markov model from the plurality of two-dimensional hidden Markov models that most closely approximates the first portion;

wherein the two-dimensional hidden Markov models represent textual elements.

12. The method of claim 1 wherein the step of generating a plurality of stochastic models further comprises the step of, for each of a respective plurality of known textual elements, determining a corresponding plurality of stochastic models by estimating a plurality of parameters for each of the plurality of stochastic models, wherein the parameters are determined from a plurality of training tokens representing said known textual element, each training token representing a segment of the textual element, and applying each of a plurality of training tokens to each segment of the textual element to determine, for each segment, the training token most closely approximating that segment.

* * * * *